US012593109B2

(12) United States Patent
Baek et al.

(10) Patent No.: US 12,593,109 B2
(45) Date of Patent: Mar. 31, 2026

(54) IMAGE DISPLAY APPARATUS AND OPERATING METHOD THEREOF

(71) Applicant: LG ELECTRONICS INC., Seoul (KR)

(72) Inventors: Insoo Baek, Seoul (KR); Dochung Hwang, Seoul (KR); Chanhun Kum, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/737,547

(22) Filed: Jun. 7, 2024

(65) Prior Publication Data

US 2024/0414410 A1     Dec. 12, 2024

(30) Foreign Application Priority Data

Jun. 9, 2023     (KR) ........................ 10-2023-0073976

(51) Int. Cl.
  *H04N 21/488*     (2011.01)
  *H04N 21/431*     (2011.01)
  *H04N 21/485*     (2011.01)
(52) U.S. Cl.
  CPC ..... *H04N 21/4884* (2013.01); *H04N 21/4314* (2013.01); *H04N 21/4858* (2013.01)
(58) Field of Classification Search
  CPC ........... H04N 21/4312; H04N 21/4314; H04N 21/4316; H04N 21/44008; H04N 21/4858; H04N 21/4884
  See application file for complete search history.

(56) References Cited

U.S. PATENT DOCUMENTS

| 4,570,232 | A | * | 2/1986 | Shikano | .................. G10L 15/12 |
| | | | | | 704/241 |
| 5,598,557 | A | * | 1/1997 | Doner | ................. G06F 16/3346 |
| | | | | | 707/999.005 |
| 6,085,160 | A | * | 7/2000 | D'hoore | ................ G10L 15/005 |
| | | | | | 704/277 |

(Continued)

FOREIGN PATENT DOCUMENTS

| KR | 1020070106408 | 11/2007 |
| KR | 1020120085385 | 8/2012 |

(Continued)

OTHER PUBLICATIONS

Korean Intellectual Property Office Application No. 10-2023-0073976, Notice of Allowance dated Oct. 31, 2024, 2 pages.

*Primary Examiner* — Michael B. Pierorazio
(74) *Attorney, Agent, or Firm* — LEE, HONG, DEGERMAN, KANG & WAIMEY

(57)     ABSTRACT

An image display apparatus includes a display configured to output a screen containing an image and closed captions and a controller, wherein the controller is configured to determine whether a first region corresponding to open captions included in the image overlaps a second region previously set for the closed captions, determine a size of the first region based on that the first region overlaps the second region, display the closed captions in one region of the screen excluding the first region, when the size of the first region is within a preset range, and display the closed captions in the second region when the size of the first region is not within the preset range.

15 Claims, 16 Drawing Sheets

10

100

400

200

(56) References Cited

U.S. PATENT DOCUMENTS

| | | | | | |
|---|---|---|---|---|---|
| 6,098,082 | A | * | 8/2000 | Gibbon | G06F 16/739 |
| | | | | | 715/255 |
| 6,442,518 | B1 | * | 8/2002 | Van Thong | G10L 15/26 |
| | | | | | 704/235 |
| 6,473,778 | B1 | * | 10/2002 | Gibbon | G06F 40/103 |
| | | | | | 715/201 |
| 7,035,468 | B2 | * | 4/2006 | Yogeshwar | G06F 16/71 |
| | | | | | 707/E17.031 |
| 7,047,191 | B2 | * | 5/2006 | Lange | G10L 15/26 |
| | | | | | 704/235 |
| 7,065,524 | B1 | * | 6/2006 | Lee | G16H 50/50 |
| | | | | | 706/45 |
| 7,092,888 | B1 | * | 8/2006 | McCarthy | G10L 15/1822 |
| | | | | | 704/277 |
| 7,110,664 | B2 | * | 9/2006 | Yogeshwar | H04N 5/76 |
| | | | | | 386/328 |
| 7,509,385 | B1 | * | 3/2009 | Rittmeyer | G06Q 10/107 |
| | | | | | 715/224 |
| 7,739,253 | B1 | * | 6/2010 | Yanovsky | G06F 16/9535 |
| | | | | | 707/706 |
| 7,761,892 | B2 | * | 7/2010 | Ellis | H04N 21/2143 |
| | | | | | 725/86 |
| 7,908,628 | B2 | * | 3/2011 | Swart | H04N 21/6377 |
| | | | | | 725/135 |
| 8,131,545 | B1 | * | 3/2012 | Moreno | G10L 15/04 |
| | | | | | 704/235 |
| 8,209,724 | B2 | * | 6/2012 | Rathod | H04N 21/435 |
| | | | | | 348/715 |
| 8,248,528 | B2 | * | 8/2012 | Hosking | H04N 7/165 |
| | | | | | 725/62 |
| 11,228,810 | B1 | * | 1/2022 | Arazi | H04N 21/6582 |
| 2002/0055950 | A1 | * | 5/2002 | Witteman | G06F 16/40 |
| | | | | | 707/E17.009 |
| 2002/0093591 | A1 | * | 7/2002 | Gong | H04N 21/2368 |
| | | | | | 348/E7.063 |
| 2003/0025832 | A1 | * | 2/2003 | Swart | H04N 21/4828 |
| | | | | | 348/E7.071 |
| 2003/0061028 | A1 | * | 3/2003 | Dey | G06F 16/40 |
| | | | | | 704/9 |
| 2003/0169366 | A1 | * | 9/2003 | Lenzi | H04N 7/10 |
| | | | | | 348/461 |
| 2003/0206717 | A1 | * | 11/2003 | Yogeshwar | G11B 27/10 |
| | | | | | 386/328 |
| 2004/0096110 | A1 | * | 5/2004 | Yogeshwar | G06F 16/51 |
| | | | | | 707/E17.031 |
| 2005/0227614 | A1 | * | 10/2005 | Hosking | H04N 7/165 |
| | | | | | 455/3.06 |
| 2006/0015339 | A1 | * | 1/2006 | Charlesworth | G10L 15/187 |
| | | | | | 704/E15.02 |
| 2007/0124147 | A1 | * | 5/2007 | Gopinath | G10L 15/19 |
| | | | | | 704/E15.021 |
| 2007/0124788 | A1 | * | 5/2007 | Wittkoter | H04N 7/165 |
| | | | | | 348/E7.071 |
| 2007/0249281 | A1 | * | 10/2007 | Rischmueller | H04W 4/18 |
| | | | | | 348/E5.093 |
| 2008/0066138 | A1 | * | 3/2008 | Bishop | G06F 40/58 |
| | | | | | 725/137 |
| 2008/0262996 | A1 | * | 10/2008 | Yogeshwar | G06F 16/71 |
| | | | | | 707/E17.031 |
| 2008/0266449 | A1 | * | 10/2008 | Rathod | H04N 21/8133 |
| | | | | | 348/E7.001 |
| 2009/0171662 | A1 | * | 7/2009 | Huang | G10L 15/1822 |
| | | | | | 704/E15.041 |
| 2014/0111688 | A1 | * | 4/2014 | Suvorov | H04N 21/43072 |
| | | | | | 348/500 |
| 2015/0271444 | A1 | * | 9/2015 | Defazio | H04N 5/45 |
| | | | | | 348/14.07 |
| 2019/0303797 | A1 | * | 10/2019 | Javali | G10L 15/22 |
| 2022/0059082 | A1 | * | 2/2022 | Saon | G06F 17/18 |
| 2022/0093103 | A1 | * | 3/2022 | Shin | G10L 15/22 |
| 2022/0223066 | A1 | * | 7/2022 | Chen | G10L 15/16 |
| 2024/0404525 | A1 | * | 12/2024 | Karia | H04N 21/4307 |

FOREIGN PATENT DOCUMENTS

| | | |
|---|---|---|
| KR | 102373517 | 3/2022 |
| KR | 1020230022056 | 2/2023 |

* cited by examiner

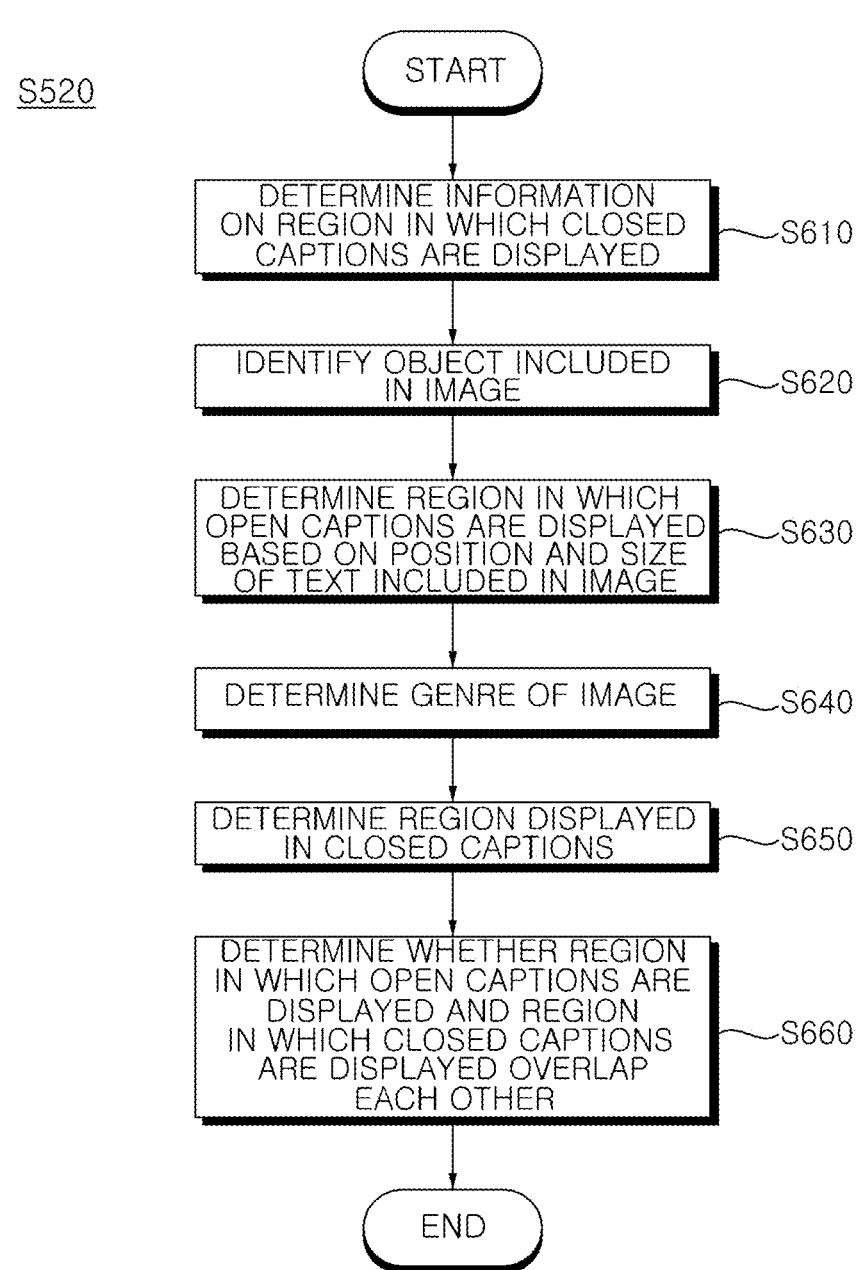

S520

START

DETERMINE INFORMATION ON REGION IN WHICH CLOSED CAPTIONS ARE DISPLAYED —— S610

IDENTIFY OBJECT INCLUDED IN IMAGE —— S620

DETERMINE REGION IN WHICH OPEN CAPTIONS ARE DISPLAYED BASED ON POSITION AND SIZE OF TEXT INCLUDED IN IMAGE —— S630

DETERMINE GENRE OF IMAGE —— S640

DETERMINE REGION DISPLAYED IN CLOSED CAPTIONS —— S650

DETERMINE WHETHER REGION IN WHICH OPEN CAPTIONS ARE DISPLAYED AND REGION IN WHICH CLOSED CAPTIONS ARE DISPLAYED OVERLAP EACH OTHER —— S660

END

TYPHOON HEADING NORTH.. HEAVY RAIN
STARTING TOMORROW

8 NEWS | CULTURE | POSTECH RESEARCH TEAM DEVELOPS NANOPARTICLE DNA STRUCTURE TRACKING ONLY CANCER CELLS

TYPHOON HEADING NORTH.. HEAVY RAIN
STARTING TOMORROW

8 NEWS | CULTURE | POSTECH RESEARCH TEAM DEVELOPS NANOPARTICLE DNA STRUCTURE TRACKING ONLY CANCER CELLS

700

740

TOMORROW, FROM SOUTHERN
REGION UNDER INFLUENCE
OF TYPHOON

TYPHOON HEADING NORTH.. HEAVY RAIN
STARTING TOMORROW

8NEWS   CULTURE   POSTECH RESEARCH TEAM DEVELOPS NANOPARTICLE DNA STRUCTURE TRACKING ONLY CANCER CELLS

IMAGE DISPLAY APPARATUS AND OPERATING METHOD THEREOF

CROSS-REFERENCE TO RELATED APPLICATION(S)

Pursuant to 35 U.S.C. § 119, this application claims the benefit of earlier filing date and right of priority to Korean Application No(s). 10-2023-0073976, filed on Jun. 9, 2023, the contents of which are all incorporated by reference herein in its entirety.

TECHNICAL FIELD

The present disclosure relates to an image display apparatus and an operating method thereof.

BACKGROUND

Image display apparatuses have the function of displaying images that users may view. For example, image display apparatuses may include TVs (television), monitors, and laptop computers including liquid crystal displays (LCDs) using liquid crystals, organic light emitting diode (OLED) displays using OLEDs, etc.

An image display apparatus may display subtitles corresponding to an image along with the image. For example, an image display apparatus may receive data regarding subtitles in real time, while displaying an image, and display subtitles corresponding to a specific scene along with the image. The subtitles displayed along with an image may be referred to as closed captions (CC). In general, closed captions include text that contains the contents of content, dialogues, monologues, etc. of characters displayed on a screen, and may help the hearing impaired or users who view images in environments with limited audio output to understand images.

In general, an image display apparatus may display closed captions according to information related to the display of closed captions, such as a position on the screen in which the closed captions are displayed, the size and color of the closed captions, etc. Information related to the display of closed captions may be included in data regarding subtitles received by the image display apparatus.

Meanwhile, when people, objects, text, etc. included in an image overlap a region in which closed captions are displayed, the closed captions covers the information included in the image, making it difficult for users to identify the corresponding information. In addition, a frequent change in the region in which closed captions are displayed may cause inconvenience in the user's perception of the subtitles and increase user fatigue.

SUMMARY

The present disclosure aims to solve the aforementioned problems and other problems.

The present disclosure provides an image display apparatus capable of changing a position at which closed captions are displayed so that a user may identify information included in an image, and an operation method thereof.

The present disclosure provides an image display apparatus capable of preventing frequent changes in a position at which closed captions are displayed, and an operating method thereof.

The present disclosure provides an image display apparatus capable of improving the readability of closed captions, and an operating method thereof.

According to embodiments of the present disclosure, an image display apparatus includes a display configured to output a screen containing an image and closed captions and a controller, wherein the controller is configured to determine whether a first region corresponding to open captions included in the image overlaps a second region previously set for the closed captions, determine a size of the first region based on that the first region overlaps the second region, display the closed captions in one region of the screen excluding the first region, when the size of the first region is within a preset range, and display the closed captions in the second region when the size of the first region is not within the preset range.

According to embodiments of the present disclosure, an operating method of an image display apparatus includes determining whether a first region corresponding to open captions included in an image overlaps a second region previously set for the closed captions, determining a size of the first region based on that the first region overlaps the second region, displaying the closed captions in one region of the screen excluding the first region through a display, when the size of the first region is within a preset range, and displaying the closed captions in the second region through the display when the size of the first region is not within the preset range.

The effects of the image display apparatus and the operating method thereof according to the present disclosure are described as follows.

According to at least one embodiment of the present disclosure, the position at which closed captions are displayed may be changed so that a user may identify information included in an image.

According to at least one embodiment of the present disclosure, frequent changes in the position at which closed captions are displayed may be prevented.

According to at least one embodiment of the present disclosure, readability of closed captions may be improved.

Additional scope of applicability of the present disclosure will become apparent from the detailed description hereinafter. However, since various changes and modifications within the spirit and scope of the present disclosure may be clearly understood by those skilled in the art, the detailed description and specific embodiments, such as preferred embodiments of the present disclosure should be understood as being given only as examples.

BRIEF DESCRIPTION OF THE DRAWINGS

FIG. 2 is an internal block diagram of an image display apparatus of FIG. 1.

FIGS. 5 and 6 are flowcharts of an operating method of an image display apparatus according to an embodiment of the present disclosure.

DETAILED DESCRIPTION

Figure 1:
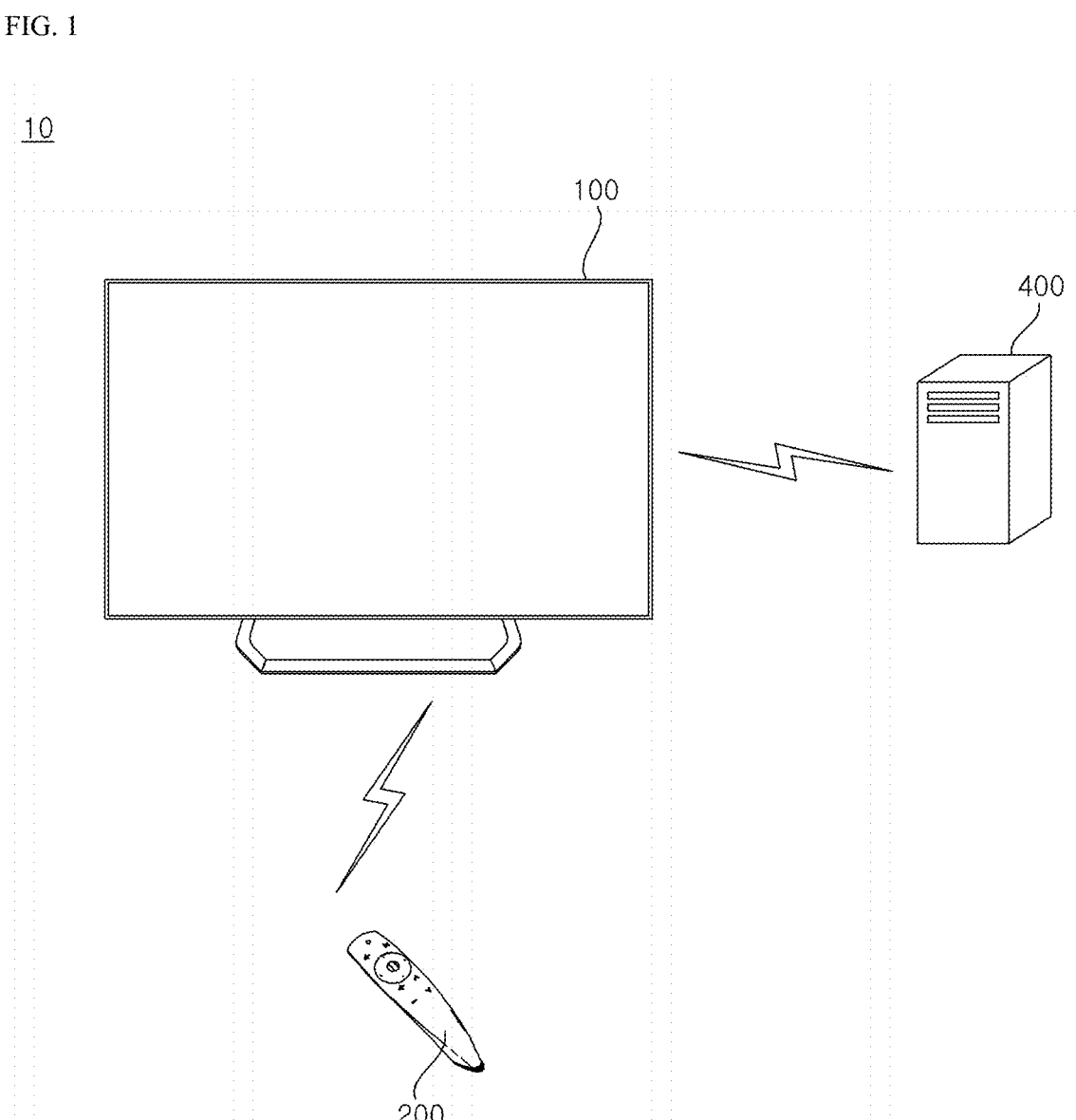
FIG. 1 is a diagram illustrating an image display system according to an embodiment of the present disclosure.

Hereinafter, embodiments of the present disclosure will be described in detail with reference to the accompanying drawings. For simplicity and clarity of description, illustration of components not associated with the description is omitted in the drawings, and the same or extremely similar elements are denoted by the same reference numerals throughout the specification.

In the following description, usage of suffixes, such as 'module', 'part' or 'unit' used for referring to elements is given merely to facilitate explanation of the present disclosure, without having any significant meaning by itself. Therefore, the 'module' or 'part' or 'unit' may be used in combination.

The terminology used herein is for the purpose of describing particular embodiments only and is not intended to limit the invention. As used herein, the singular forms "a", "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, in this disclosure, terms, such as first, second, etc. may be used to describe various elements, but these elements are not limited by these terms. These terms are only used to distinguish one element from another.

FIG. 1 is a diagram illustrating an image display system according to various embodiments of the present disclosure.

Referring to FIG. 1, an image display system 10 may include an image display apparatus 100 and/or a remote controller 200.

The image display apparatus 100 may be an apparatus that processes and outputs images. The image display apparatus 100 is not particularly limited as long as it may output a screen corresponding to image signals, such as a TV, laptop computer, or monitor.

The image display apparatus 100 may receive a broadcast signal, process the received broadcast signal, and output a processed broadcast image. When the image display apparatus 100 receives a broadcast signal, the image display apparatus 100 may correspond to a broadcast receiving device.

The image display apparatus 100 may receive broadcast signals wirelessly through an antenna or may receive broadcast signals by wire through a cable. For example, the image display apparatus 100 may receive terrestrial broadcast signals, satellite broadcast signals, cable broadcast signals, and Internet protocol television (IPTV) broadcast signals.

The remote controller 200 may be connected to the image display apparatus 100 by wire and/or wirelessly and provide various control signals to the image display apparatus 100. Here, the remote controller 200 may include a device which establishes a wired or wireless network with the image display apparatus 100 to transmit various control signals to the image display apparatus 100 or receive signals related to various operations processed in the image display apparatus 100 from the image display apparatus 100.

For example, various input devices, such as a mouse, keyboard, spatial remote control, trackball, and joystick may be used as the remote controller 200. The remote controller 200 may be referred to as an external device, and hereinafter, it should be noted that the external device and the remote controller may be used interchangeably as needed.

The image display apparatus 100 may be connected to only a single remote controller 200 or simultaneously connected to two or more remote controllers 200 and change an object displayed on the screen or adjust a state of the screen based on a control signal provided from each remote controller 200.

Meanwhile, the image display system 10 may further include at least one server 400. The image display apparatus 100 may transmit and receive data to and from the server 400. For example, the image display apparatus 100 may transmit and receive data to and from the server 400 via a network, such as the Internet.

The image display apparatus 100 may transmit data related to an operation performed according to a user input to the server 400, and the server 400 may store the data received from the image display apparatus 100.

Figure 2:
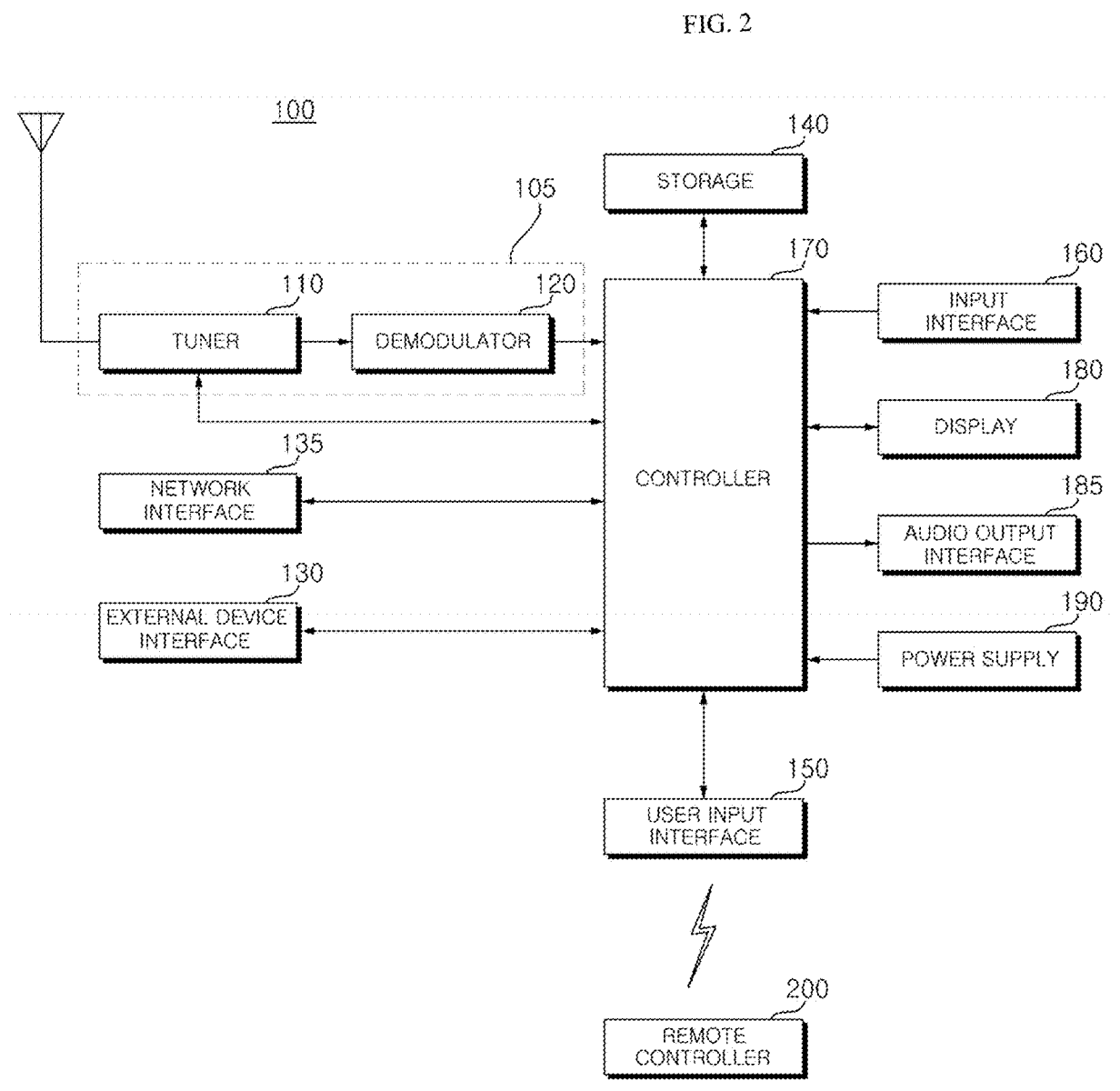

FIG. 2 is an internal block diagram of the image display apparatus of FIG. 1.

Referring to FIG. 2, the image display apparatus 100 may include a broadcast receiver 105, an external device interface 130, a network interface 135, a storage 140, a user input interface 150, an input interface 160, a controller 170, a display 180, an audio output interface 185, and/or a power supply 190.

The broadcast receiver 105 may include a tuner 110 and a demodulator 120.

Meanwhile, unlike the drawing, the image display apparatus 100 may include only the broadcast receiver 105 and the external device interface 130, among the broadcast receiver 105, the external device interface 130, and the network interface 135. That is, the image display apparatus 100 may not include the network interface 135.

The tuner 110 may select a broadcast signal corresponding to a channel selected by the user or all previously stored channels among broadcast signals received through an antenna (not shown) or a cable (not shown). The tuner 110 may convert the selected broadcast signal into an intermediate frequency signal or a baseband image or audio signal.

For example, if the selected broadcast signal is a digital broadcast signal, the tuner 110 may convert the digital broadcast signal into a digital IF signal (DIF), and if the selected broadcast signal is an analog broadcast signal, the tuner 110 may convert the analog broadcast signal into an analog baseband image or audio signal (CVBS/SIF). That is, the tuner 110 may process digital broadcast signals or analog broadcast signals. The analog baseband image or audio signal (CVBS/SIF) output from the tuner 110 may be directly input to the controller 170.

Meanwhile, the tuner 110 may sequentially select broadcast signals of all broadcast channels stored through a channel memory function from received broadcast signals and convert them into intermediate frequency signals or baseband image or audio signals.

Meanwhile, the tuner 110 may include multiple tuners in order to receive broadcast signals of multiple channels. Alternatively, a single tuner that simultaneously receives broadcast signals from multiple channels may also be provided.

The demodulator 120 may receive the converted digital IF signal (DIF) from the tuner 110 and perform a demodulation operation.

The demodulator 120 may output a stream signal TS after performing demodulation and channel decoding. Here, the stream signal may be a signal in which an image signal, audio signal, or data signal are multiplexed.

The stream signal output from the demodulator 120 may be input to the controller 170. After performing demultiplexing and image/audio signal processing, the controller 170 may output an image through the display 180 and voice through the audio output interface 185.

The external device interface 130 may transmit or receive data to or from a connected external device. To this end, the external device interface 130 may include an A/V input/output interface (not shown).

The external device interface 130 may be wired/wirelessly connected to external devices, such as a digital versatile disk (DVD), Blu ray, game device, camera, camcorder, computer (laptop), set-top box, etc. and perform input/output operations with external devices.

In addition, the external device interface 130 may establish a communication network with various remote controllers 200 as shown in FIG. 1 to receive a control signal related to an operation of the image display apparatus 100 from the remote controller 200 or transmit data related to an operation of the image display apparatus 100 to the remote controller 200.

The A/V input/output interface may receive image and audio signals from an external device. For example, the A/V input/output interface may include an Ethernet terminal, universal serial bus (USB) terminal, composite image banking sync (CVBS) terminal, component terminal, S-video terminal (analog), digital visual interface (DVI) terminal, high definition multimedia interface (HDMI) terminal, mobile high-definition link (MHL) terminal, RGB terminal, D-SUB terminal, IEEE 1394 terminal, SPDIF terminal, liquid HD terminal, etc. Digital signals input through these terminals may be transmitted to the controller 170. Here, analog signals input through the CVBS terminal and the S-video terminal may be converted into digital signals through an analog-to-digital converter (not shown) and transmitted to the controller 170.

The external device interface 130 may include a wireless communication interface (not shown) for short-range wireless communication with other electronic devices. Through the wireless communication interface, the external device interface 130 may exchange data with an adjacent mobile terminal. For example, the external device interface 130 may receive device information, executed application information, application images, etc. from the mobile terminal in a mirroring mode.

The external device interface 130 may perform short-range wireless communication using Bluetooth, radio frequency identification (RFID), Infrared data association (IrDA), ultra-wideband (UWB), ZigBee, etc.

The network interface 135 may provide an interface for connecting the image display apparatus 100 to a wired/wireless network including the Internet.

The network interface 135 may include a communication module (not shown) for connection to a wired/wireless network. For example, the network interface 135 may include a communication module for wireless LAN (WLAN), (Wi-Fi), wireless broadband (Wibro), world interoperability for microwave Access (Wimax), and high speed downlink packet access (HSDPA).

The network interface 135 may transmit or receive data with other users or other electronic devices through a connected network or another network linked to the connected network.

The network interface 135 may receive web content or data provided by a content provider or network operator. That is, the network interface 135 may receive content, such as movies, advertisements, games, VOD, broadcasting, etc. and information related thereto provided from a content provider or network provider through a network.

The network interface 135 may receive firmware update information and update files provided by a network operator and transmit data to an Internet or content provider or a network operator.

The network interface 135 may select and receive a desired application from among applications open to the public through a network.

The storage 140 may store programs for processing and controlling each signal in the controller 170 or store signal-processed image, audio, or data signals. For example, the storage 140 may store application programs designed for the purpose of performing various tasks that may be processed by the controller 170, and selectively provide some of the stored application programs at the request of the controller 170.

Programs stored in the storage 140 are not particularly limited as long as they may be executed by the controller 170.

The storage 140 may perform a function for temporarily storing image, audio, or data signals received from an external device through the external device interface 130.

The storage 140 may store information on a certain broadcast channel through a channel memory function, such as a channel map.

Although FIG. 2 shows an embodiment in which the storage 140 is provided separately from the controller 170, the scope of the present disclosure is not limited thereto, and the storage 140 may be included in the controller 170.

The storage 140 may include at least one of a volatile memory (e.g., DRAM, SRAM, SDRAM, etc.), non-volatile memory (e.g., flash memory, hard disk drive (HDD), and solid state drive (SSD), etc.). In various embodiments of the present disclosure, the storage 140 and memory may be used interchangeably.

The user input interface 150 may transmit a signal input by the user to the controller 170 or transmit a signal from the controller 170 to the user.

For example, the user input interface 150 may transmit/receive a user input signal, such as power ON/OFF, channel selection, and screen setting from the remote controller 200, transmit a user input signal input from a local key (not shown), such as a power key, channel key, volume key, and setting value (not shown), transmit a user input signal input from a sensor (not shown) sensing a user's gesture to the controller 170, or transmit a signal from the controller 170 to the sensor.

The input interface 160 may be provided on one side of a main body of the image display apparatus 100. For example, the input interface 160 may include a touch pad, physical buttons, etc.

The input interface 160 may receive various user commands related to the operation of the image display apparatus 100 and transmit control signals corresponding to the input commands to the controller 170.

The input interface 160 may include at least one microphone (not shown) and may receive the user's voice through the microphone.

The controller 170 may include at least one processor, and may control the overall operation of the image display apparatus 100 using the processor included therein. Here, the processor may be a general processor, such as a central processor (CPU). Of course, the processor may be a dedicated device, such as an ASIC, or another hardware-based processor.

The controller 170 may demultiplex a stream input through the tuner 110, demodulator 120, external device interface 130, or network interface 135 or process demultiplexed signals to generate and output signals for image or audio output.

The display 180 may convert an image signal, data signal, OSD signal, and control signal processed by the controller 170 or an image signal, data signal, and control signal received from the external device interface 130 to generate a driving signal.

The display 180 may include a display panel (not shown) having a plurality of pixels.

A plurality of pixels provided in the display panel may include RGB subpixels. Alternatively, a plurality of pixels provided in the display panel may include RGBW subpixels. The display 180 may convert the image signals, data signal, OSD signal, and control signal processed by the controller 170 to generate a driving signal for a plurality of pixels.

The display 180 may be a plasma display panel (PDP), liquid crystal display (LCD), organic light emitting diode (OLED), or flexible display and may be a 3D display. The 3D display 180 may be divided into a glasses-free type and a glasses type.

Meanwhile, the display 180 may be configured as a touch screen and used as an input device in addition to an output device.

The audio output interface 185 receives an audio-processed signal from the controller 170 and outputs the same as voice.

The image signal processed by the controller 170 may be input to the display 180 and displayed as an image corresponding to the image signal. In addition, the image signal processed by the controller 170 may be input to an external output device through the external device interface 130.

The voice signal processed by the controller 170 may be output as sound to the audio output interface 185. In addition, the voice signal processed by the controller 170 may be input to an external output device through the external device interface 130.

Although not shown in FIG. 2, the controller 170 may include a demultiplexer, an image processor, etc. This will be described below with reference to FIG. 3.

In addition, the controller 170 may control overall operations within the image display apparatus 100. For example, the controller 170 may control the tuner 110 to select (tune) a broadcast corresponding to a channel selected by the user or a previously stored channel.

In addition, the controller 170 may control the image display apparatus 100 by a user command input through the user input interface 150 or an internal program.

Meanwhile, the controller 170 may control the display 180 to display an image. Here, the image displayed on the display 180 may be a still image or a moving image and may be a 2D image or a 3D image.

Meanwhile, the controller 170 may cause a certain 2D object to be displayed in the image displayed on the display 180. For example, the object may be at least one of a connected web screen (newspaper, magazine, etc.), electronic program guide (EPG), various menus, widgets, icons, still images, images, and text.

Meanwhile, the image display apparatus 100 may further include an image capture device (not shown). The image capture device may image the user. The image capture device may be implemented as one camera, but is not limited thereto and may also be implemented as a plurality of cameras. Meanwhile, the image capture device may be embedded in the image display apparatus 100 in an upper portion of the display 180 or may be disposed separately. Image information captured by the image capture device may be input to the controller 170.

The controller 170 may recognize the user's position based on the image captured by the image capture device. For example, the controller 170 may determine a distance (z-axis coordinate) between the user and the image display apparatus 100. In addition, the controller 170 may recognize the x-axis coordinates and y-axis coordinates in the display 180 corresponding to the user's position.

The controller 170 may detect a user's gesture based on each or a combination of an image captured by the image capture device or a sensed signal from the sensor.

The power supply 190 may supply corresponding power throughout the image display apparatus 100. In particular, power may be supplied to the controller 170, which may be implemented in the form of a system on chip (SOC), the display 180 for displaying images, and the audio output interface 185 for audio output.

Specifically, the power supply 190 may include a converter (not shown) that converts AC power to DC power and a DC/DC converter (not shown) that converts a level of DC power.

The remote controller 200 may transmit a user input to the user input interface 150. To this end, the remote controller 200 may use Bluetooth, radio frequency (RF) communication, RFID communication, UWB, ZigBee, etc. In addition, the remote controller 200 may receive image, audio, or data signals output from the user input interface 150, and display them on the remote controller 200 or output voice.

Meanwhile, the aforementioned image display apparatus 100 may be a fixed or mobile digital broadcasting receiver capable of receiving digital broadcasting.

Meanwhile, the block diagram of the image display apparatus 100 shown in FIG. 2 is only a block diagram for an embodiment of the present disclosure, and each component of the block diagram may be combined, added, or omitted according to the specifications of the image display apparatus 100 that is actually implemented.

That is, as needed, two or more components may be combined into one component, or one component may be subdivided into two or more components. In addition, the functions performed by each block are for describing embodiments of the present disclosure, and the specific operations or devices do not limit the scope of the present disclosure.

Figure 3:
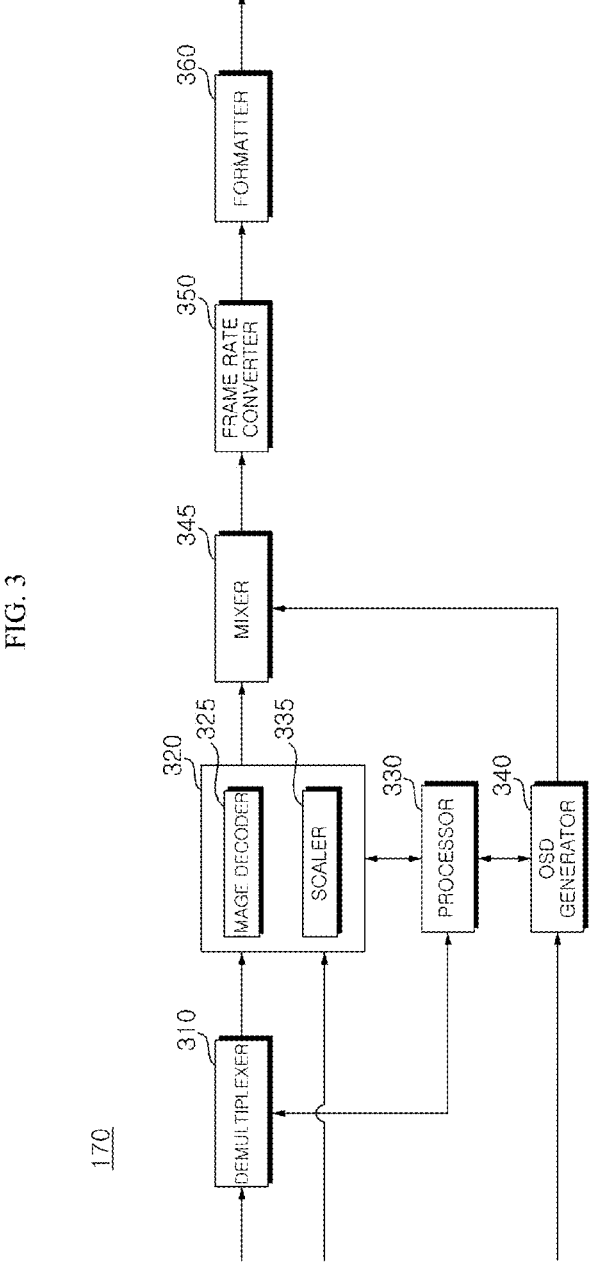
FIG. 3 is an internal block diagram of a controller of FIG. 2.

FIG. 3 is an internal block diagram of the controller of FIG. 2.

Referring to FIG. 3, the controller 170 according to an embodiment of the present disclosure may include a demultiplexer 310, an image processor 320, a processor 330, an OSD generator 340, a mixer 345, a frame rate converter 350, and/or a formatter 360. In addition, the controller 170 may further include an audio processor (not shown) and a data processor (not shown).

The demultiplexer 310 may demultiplex an input stream. For example, when MPEG-2 TS is input, the demultiplexer 310 demultiplex the MPEG-2 TS to be separated into image, voice, and data signals. Here, the stream signal input to the demultiplexer 310 may be a stream signal output from the tuner 110, demodulator 120, or external device interface 130.

The image processor 320 may perform image processing of demultiplexed image signals. To this end, the image processor 320 may include an image decoder 325 and a scaler 335.

The image decoder 325 may decode the demultiplexed image signal, and the scaler 335 may perform scaling so that resolution of the decoded image signal may be output on the display 180.

The image decoder 325 may include decoders of various standards. For example, the image decoder 325 may include an MPEG-2, H.264 decoder, a 3D image decoder for a color image and depth image, and a decoder for multiple view images.

The processor 330 may control overall operations within the image display apparatus 100 or the controller 170. For example, the processor 330 may control the tuner 110 to select (tune) a broadcast corresponding to a channel selected by the user or a pre-stored channel.

In addition, the processor 330 may control the image display apparatus 100 by a user command input through the user input interface 150 or an internal program.

In addition, the processor 330 may perform data transmission control with the network interface 135 or the external device interface 130.

In addition, the processor 330 may control the operations of the demultiplexer 310, the image processor 320, and the OSD generator 340 within the controller 170.

The OSD generator 340 may generate an OSD signal according to user input or on its own. For example, the OSD generator 340 may generate a signal for displaying various information in graphics or text on the screen of the display 180.

The generated OSD signal may include various data, such as a user interface screen, various menu screens, widgets, and icons of the image display apparatus 100. In addition, the generated OSD signal may include 2D objects or 3D objects.

In addition, the OSD generator 340 may generate a pointer that may be displayed on the display 180 based on a pointing signal input from the remote controller 200.

The OSD generator 340 may include a pointing signal processor (not shown) that generates a pointer. It is also possible for the pointing signal processor (not shown) to be provided separately rather than within the OSD generator 240.

The mixer 345 may mix the OSD signal generated by the OSD generator 340 and the decoded image signal processed by the image processor 320. The mixed image signal may be provided to the frame rate converter 350.

The frame rate converter (FRC) 350 may convert a frame rate of an input image. Meanwhile, the frame rate converter 350 may also output the image as is without separate frame rate conversion.

The formatter 360 may arrange a left eye image frame and a right eye image frame of the frame rate converted 3D image. In addition, the formatter 360 may output a synchronization signal Vsync for opening the left eye glasses and the right eye glasses of a 3D viewing device (not shown).

Meanwhile, the formatter 360 may change a format of the input image signal into an image signal to be displayed on the display 180 and output the same.

In addition, the formatter 360 may change a format of the 3D image signal. For example, the formatter 360 may change the format of the 3D image signal into one of various 3D formats, such as side-by-side format, top/down format, frame sequential format, interlaced format, and checker box format.

Meanwhile, the formatter 360 may convert a 2D image signal into a 3D image signal. For example, according to a 3D image generating algorithm, an edge or an object selectable from a 2D image signal may be detected, and an object according to the detected edge or the selectable object may be separately generated as a 3D image signal. Here, the generated 3D image signal may be separated into a left eye image signal L and a right eye image signal R to be aligned, as described above.

Meanwhile, although not shown in the drawing, it is also possible to further dispose a 3D processor (not shown) for 3-dimensional effect signal processing after the formatter 360. The 3D processor may process brightness, tint, and color adjustment of the image signal to improve 3D effects. For example, signal processing may be performed to make a near region clear and a distant region blurry. Meanwhile, the functions of the 3D processor may be merged into the formatter 360 or within the image processor 320.

Meanwhile, the audio processor (not shown) in the controller 170 may perform audio processing of the demultiplexed audio signal. To this end, the audio processor (not shown) may include various decoders.

In addition, the audio processor (not shown) within the controller 170 may process bass, treble, and volume control.

The data processor (not shown) within the controller 170 may perform data processing of the demultiplexed data signal. For example, when the demultiplexed data signal is an encoded data signal, the data processor may decode the encoded data signal. The encoded data signal may be electronic program guide information including broadcast information, such as a start time and an end time of a broadcast program aired on each channel.

Meanwhile, the block diagram of the controller 170 shown in FIG. 3 is only a block diagram for an embodiment of the present disclosure, and each component of the block diagram may be integrated, added, or omitted according to the specifications of the controller 170 that is actually implemented.

In particular, the frame rate converter 350 and the formatter 360 may not be provided within the controller 170 but may be provided separately or as a single module.

Figure 4:
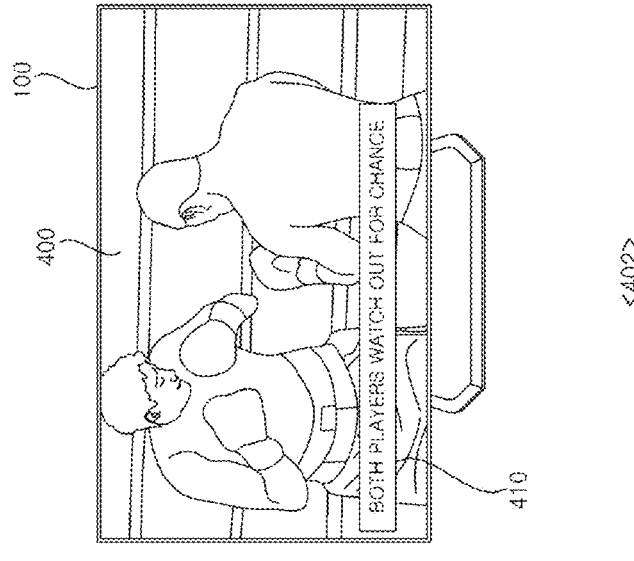
FIG. 4 is a diagram illustrating an example of an image and closed captions output through the image display apparatus of FIG. 1.

Referring to reference numerals 401 and 402 in FIG. 4, the image display apparatus 100 may output an image 400. For example, the image display apparatus 100 may output the image 400 corresponding to a received broadcast signal.

The image display apparatus 100 may receive a broadcast signal including the image 400 and closed captions 410. For example, the processor 330 of the image display apparatus 100 may extract the closed captions 410 from a signal demultiplexed through the demultiplexer 310.

The image display apparatus 100 may display the closed captions 410 corresponding to the image 400. The image display apparatus 100 may output the closed captions 410 included in the broadcast signal together with the image 400. The image display apparatus 100 may output the closed captions 410 together with the image 400 based on activation of a function for displaying the closed captions 410. The image display apparatus 100 may output only the image 400 based on deactivation of the function for displaying the closed captions 410.

The image display apparatus 100 may display the closed captions 410 based on information on the display of the closed captions 410. Information regarding the display of the closed captions 410 may be included in the broadcast signal. Information regarding the display of the closed captions 410 may include a position at which the closed captions 410 are displayed, a size, color, font, and background color of the closed captions 410, and transparency of the background. Hereinafter, information on the display of closed captions may be referred to as subtitle setting information.

The processor 330 of the image display apparatus 100 may determine a position at which the closed captions 410 are displayed, a size of the closed captions 410, etc. Here, the OSD generator 340 of the image display apparatus 100 may generate a signal corresponding to the closed captions 410 according to the position at which the closed captions 410 are displayed, the size of the closed captions 410, etc. determined by the processor 330.

Figure 5:
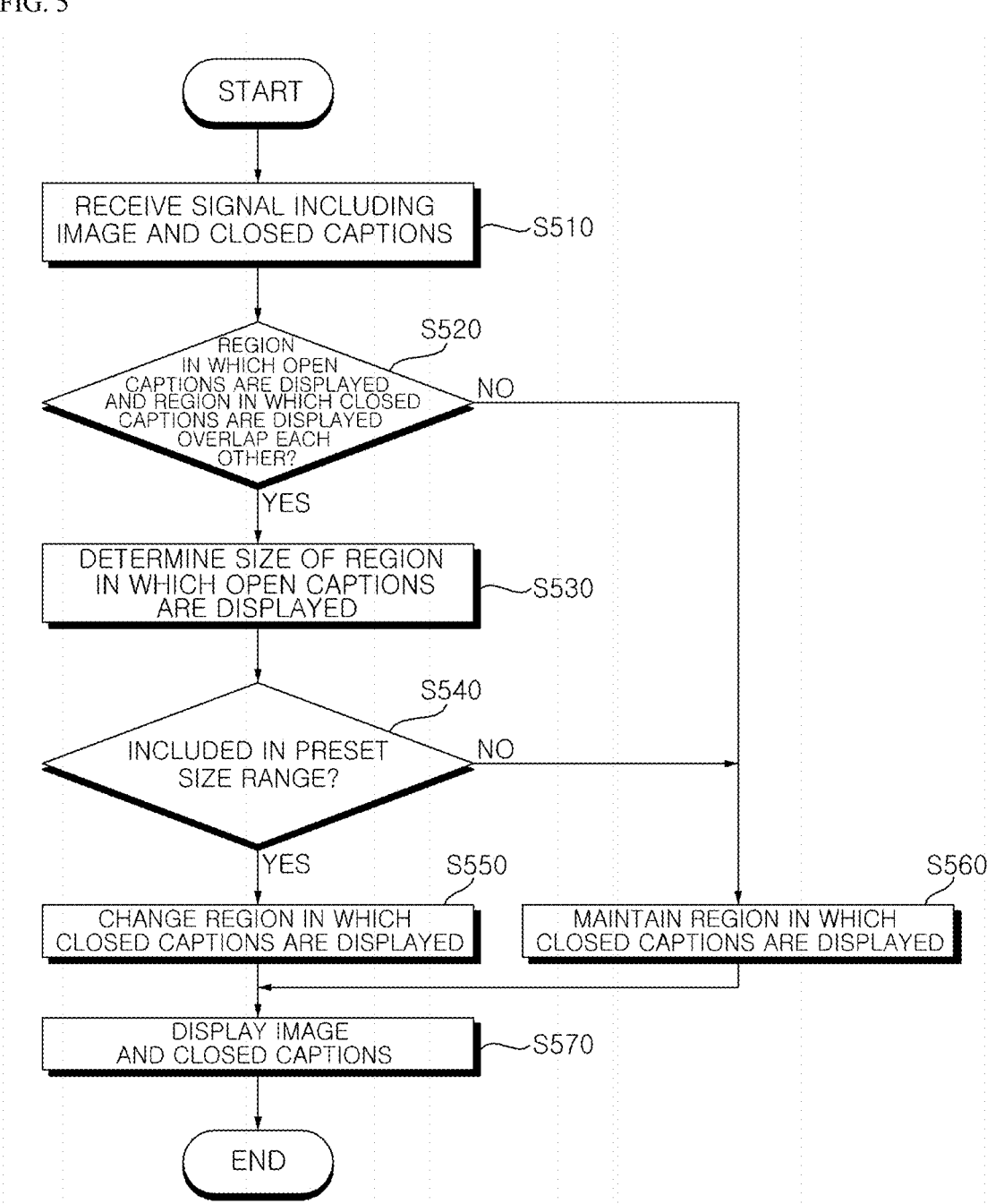

FIGS. 5 and 6 are flowcharts of an operating method of the image display apparatus.

Referring to FIG. 5, the image display apparatus 100 may receive a broadcast signal including an image and closed captions in operation S510. For example, the image display apparatus 100 may select a signal corresponding to a specific channel among broadcast signals received through an antenna or cable.

The image display apparatus 100 may determine whether the region in which text included in the image is displayed and the region in which closed captions are displayed overlap each other in operation S520. Here, the text included in the image may be named open captions (OC). Hereinafter, the region in which open captions are displayed may be referred to as an OC region, and the region in which closed captions are displayed may be referred to as a CC region. For example, the OC region may be a region in which text including characters, numbers, and/or symbols are displayed continuously along one line. Here, a spacing between characters, numbers, and/or symbols included in one OC region may be equal to or less than a predetermined spacing. An overlap between the OC region and the CC region is described with reference to FIG. 6.

Referring to FIG. 6, the image display apparatus 100 may determine information on the CC region in operation S610. For example, the image display apparatus 100 may determine a position at which closed captions are displayed, a size of closed captions, etc., based on caption setting information included in the broadcast signal.

The image display apparatus 100 may identify an object included in the image in operation S620. Here, the object may include text, people, animals, things, etc. For example, the image display apparatus 100 may identify the object by extracting features of the object included in the image. According to an embodiment, the image display apparatus 100 may identify each object included in the image based on at least one trained model. For example, the storage 140 of the image display apparatus 100 may store at least one trained model for an object that has been previously trained through machine learning, such as deep learning. Here, the trained model for the object may include a trained model for a human face, a trained model for optical character recognition (OCR) for characters, numbers, symbols, etc., depending on the type of object. Meanwhile, machine learning means that a computer learns through data without a person directly instructing the computer to use logic, and through this, the computer solves problems. Deep learning is a method of teaching computers how to think like humans based on artificial neural networks (ANNs) and refers to an artificial intelligence technology that allows computers to learn like humans on their own. ANNs may be implemented in a software form or in a hardware form, such as chips. For example, ANNs may include various types of algorithms, such as deep neural network (DNN), convolutional neural network (CNN), recurrent neural network (RNN), deep belief network (DBN).

In operation S630, the image display apparatus 100 may determine at least one OC region in which open captions are displayed based on the position and size of text included in the image.

The image display apparatus 100 may determine a genre of the image in operation S640. For example, the image display apparatus 100 may determine the genre of the image based on the position at which the open captions included in the image are displayed, the content of the open captions, etc. For example, the image display apparatus 100 may determine the genre of the image based on information on the genre of the image included in the broadcast signal, for example, the genre of the image included in metadata of the image signal.

The image display apparatus 100 may determine the CC region in operation S650. For example, the image display apparatus 100 may determine the CC region based on the position at which the closed captions are displayed and the size of the closed captions of the caption setting information. Hereinafter, the region on the screen corresponding to the subtitle setting information may be referred to as an initial setting region.

According to an embodiment, the image display apparatus 100 may set a region (hereinafter referred to as a restricted region) in which the display of closed captions is restricted based on the genre of the image. For example, when it is determined that the genre of the image is news, the image display apparatus 100 may set a region corresponding to a predetermined distance from the bottom of the screen of the display 180 as a restricted region. For example, when the genre of the image is determined to be home shopping, the image display apparatus 100 may set, as the restricted region, a region corresponding to a first distance from the bottom of the screen of the display 180, a region corresponding to a second distance from a left end, and/or a region corresponding to a third distance from a right end. For example, if it is determined that the genre of the image is drama, entertainment, etc., the image display apparatus 100 may not set a restricted region.

According to an embodiment, the image display apparatus 100 may set a restricted region based on history of determining the genre of the image. When it is determined that the genre of the image is a specific genre, the image display apparatus 100 may maintain the setting of the restricted region corresponding to the specific genre for a predetermined period of time. For example, when the genre of the image is determined to be news, the image display apparatus 100 may set, as the restricted region, a first region corresponding to the news for a first time corresponding to the news from a time point at which the genre of the image is determined to be news. Here, if the genre of the image is determined to be news again before the first time has elapsed, the image display apparatus 100 may set, as the restricted region, the first region for the first time again from a time point at which the genre of the image is determined to be news again. Meanwhile, if it is determined that the genre of the image is a different genre (e.g., home shopping) from the news before the first time has elapsed, the image display apparatus 100 may set, as the restricted region, a second region corresponding to the genre (e.g., home shopping) different from news for a second time corresponding to the genre (e.g., home shopping) different from news from a time point at which the genre of the image is determined to be a different genre (e.g., home shopping) from the news.

If at least a portion of the initial setting region overlaps the restricted region, the image display apparatus 100 may determine a CC region in a remaining region excluding the restricted region on the screen of the display 180. For example, the image display apparatus 100 may determine, as the CC region, a region located at the shortest distance from the initial setting region in the remaining region excluding the restricted region. Here, the edge of the region located at the shortest distance from the initial setting region may correspond to the edge of the restricted region.

The image display apparatus 100 may determine whether the OC region and the CC region overlap each other in operation S660.

Referring back to FIG. 5, the image display apparatus 100 may determine the size of the OC region when the OC region and the CC region overlap each other in operation S530. For example, the image display apparatus 100 may determine the size of each OC region based on the size of text included in the OC region. For example, the image display apparatus 100 may determine the size of each OC region based on the length of the OC region in a vertical direction.

According to an embodiment, the image display apparatus 100 may first determine the size of the OC region that overlaps the CC region. Here, the image display apparatus 100 may determine the size of the OC region that does not overlap with the CC region, based on the result of determining the size of the OC region that overlaps with the CC region. For example, when the size of the OC region that overlaps the CC region is within a preset size range, the image display apparatus 100 may determine the size of the OC region that does not overlap the CC region.

The image display apparatus 100 may determine whether at least one of the sizes of the OC region overlapping the CC region is within the preset size range in operation S540. For example, the image display apparatus 100 may determine whether the size of the OC region is within the preset size range based on whether the size of the text included in the OC region is greater than or equal to a first size or less than a second size.

According to an embodiment, the preset size range may be determined according to a preset ratio to the overall size of the screen of the display 180. That is, the preset size range may be determined according to the overall size of the screen of the display 180. For example, when a length of the OC region in the vertical direction is 2% or less or 20% or more of the total length in the vertical direction of the screen of the display 180, the image display apparatus 100 may determine that the size of the OC region is not within the preset size range.

The image display apparatus 100 may change the CC region in operation S550 when at least one of the sizes of the OC region overlapping the CC region is within the preset size range. For example, the image display apparatus 100 may change the CC region so that closed captions are displayed in a region of the screen of the display 180 excluding the OC region having the size within the preset size range.

According to an embodiment, the image display apparatus 100 may determine, as the CC region, a region located at the shortest distance in a preset direction (e.g., the vertical direction) from a region previously set as the CC region in a region of the screen of the display 180.

According to an embodiment, the image display apparatus 100 may change the CC region so that closed captions are display in a remaining region excluding a region corresponding to a specific object (e.g., a human face, a sign language region) in a region of the screen of the display 180.

Meanwhile, in operation S560, when the OC region and the CC region do not overlap each other or when the size of the OC region overlapping the CC region is not entirely within the preset size range, the image display apparatus 100 may maintain preset region as the CC region.

According to an embodiment, when the OC region and the CC region do not overlap each other or when the size of the OC region overlapping the CC region is not entirely within the preset size range, the image display apparatus 100 may determine whether the CC region overlaps the region corresponding to the specific object (e.g., human face, sign language region). When the CC region does not overlap the region corresponding to the specific object, the image display apparatus 100 may maintain the preset region as the CC region. Meanwhile, when the CC region overlaps the region corresponding to the specific object, the image display apparatus 100 may change the CC region so that closed captions are displayed in a region excluding an OC region having a size within a preset size range and the region corresponding to the specific object, on the screen of the display 180.

The image display apparatus 100 may output an image through the display 180 in operation S570. Here, the image display apparatus 100 may display closed captions in the region determined as the CC region.

Figure 7A:
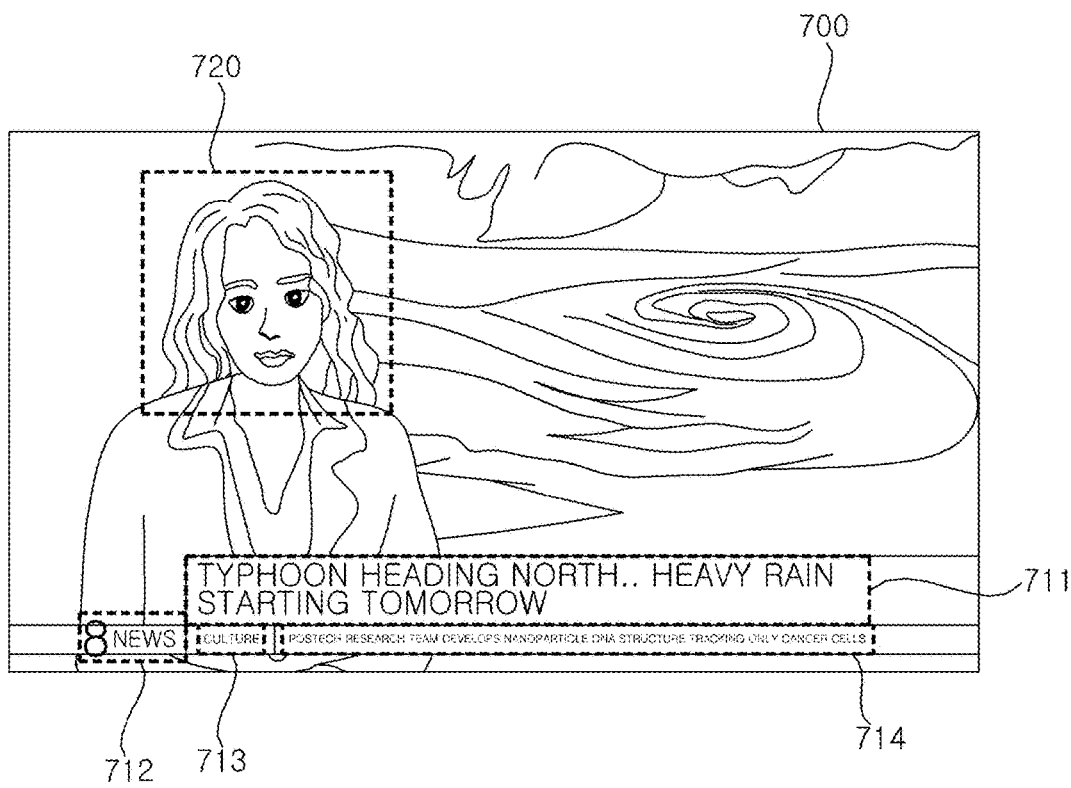
FIGS. 7A to 11C are drawings referenced in the description of an operation of an image display apparatus according to an embodiment of the present disclosure.

Referring to FIG. 7A, the image display apparatus 100 may receive a broadcast signal including a first image 700. The first image 700 may include a plurality of OC regions 711 to 714 in which open captions are displayed and a region 720 corresponding to a human face.

The image display apparatus 100 may determine a genre of the first image 700. The image display apparatus 100 may determine the genre of the first image 700 based on the contents of text included in the first image 700. For example, the image display apparatus 100 determine, as news, the genre of the first image 700 based on the contents of the text in an OC region 712 in which 'NEWS' is displayed among the plurality of OC regions 711 to 714.

Figure 7B:
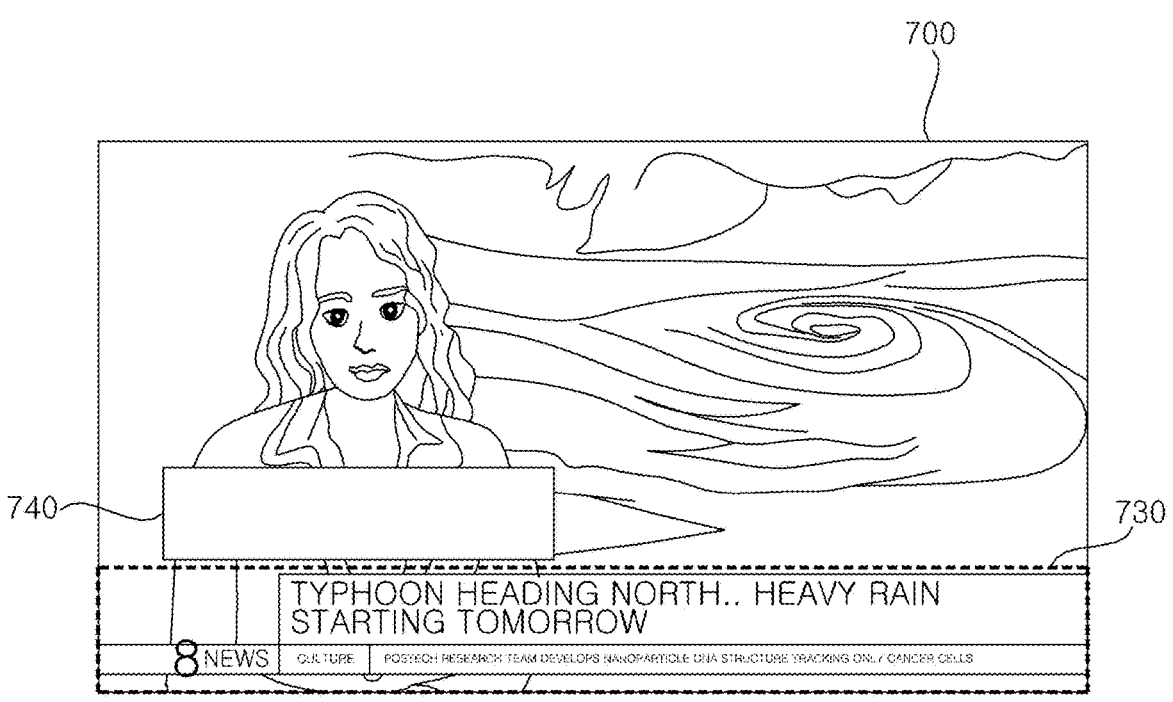

Referring to FIG. 7B, the image display apparatus 100 may determine, as a restricted region, a region 730 corresponding to a predetermined distance from the bottom of the screen of the display 180 based on determining that the genre of the first image 700 is news.

The image display apparatus 100 may determine the CC region 740. For example, the image display apparatus 100 may determine an initial setting region based on subtitle setting information. Here, when the initial setting region overlaps a restricted region 730, the image display apparatus 100 may determine, as the CC region, a region located at the shortest distance from the initial setting region in the remaining region excluding the restricted region 730. Meanwhile, the image display apparatus 100 may determine, as the CC region, the initial setting region when the initial setting region does not overlap the restricted region 730.

Figure 7C:
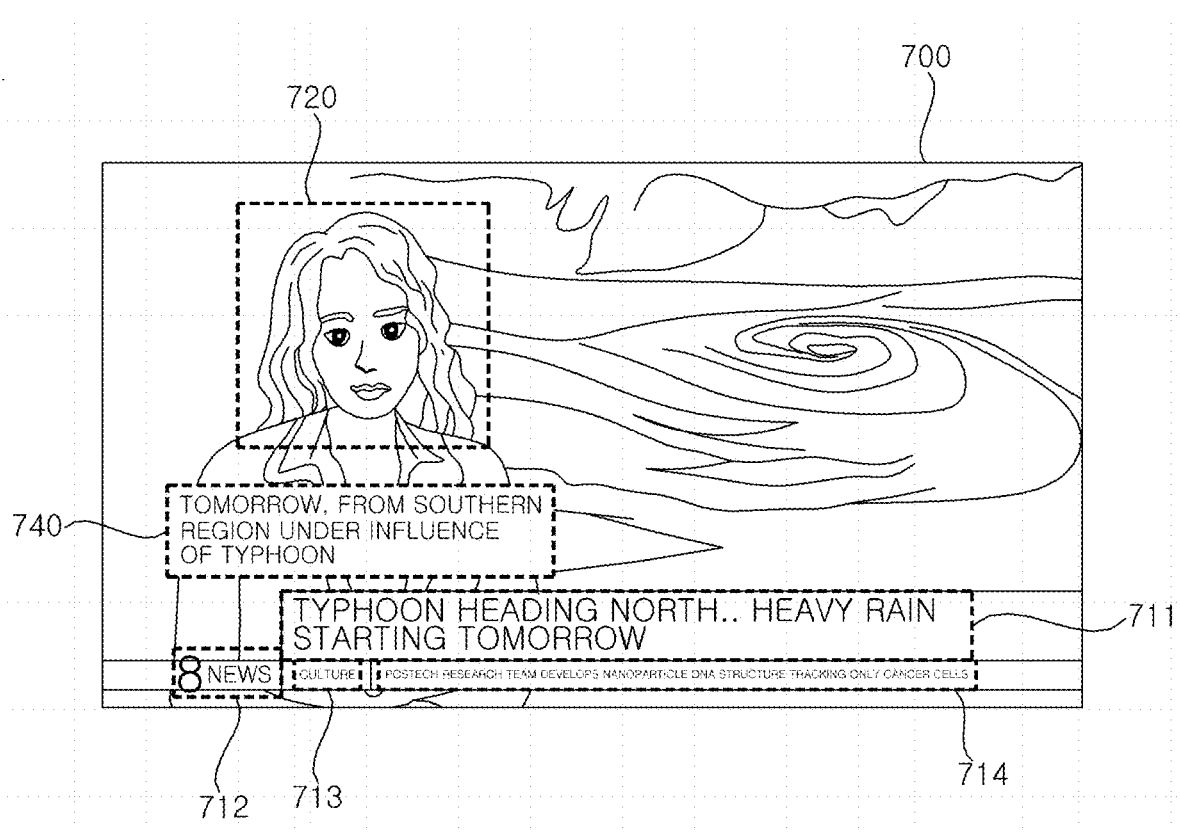

Referring to FIG. 7C, the image display apparatus 100 may determine whether a plurality of OC regions 711 to 714 and a CC region 740 overlap. Since the plurality of OC regions 711 to 714 and the CC region 740 do not overlap, the CC region 740 may be maintained. In addition, since the CC region 740 does not overlap the region 720 corresponding to the human face, the CC region 740 may be maintained. The image display apparatus 100 may display closed captions in the CC region 740 along with the first image 700.

Figure 8A:
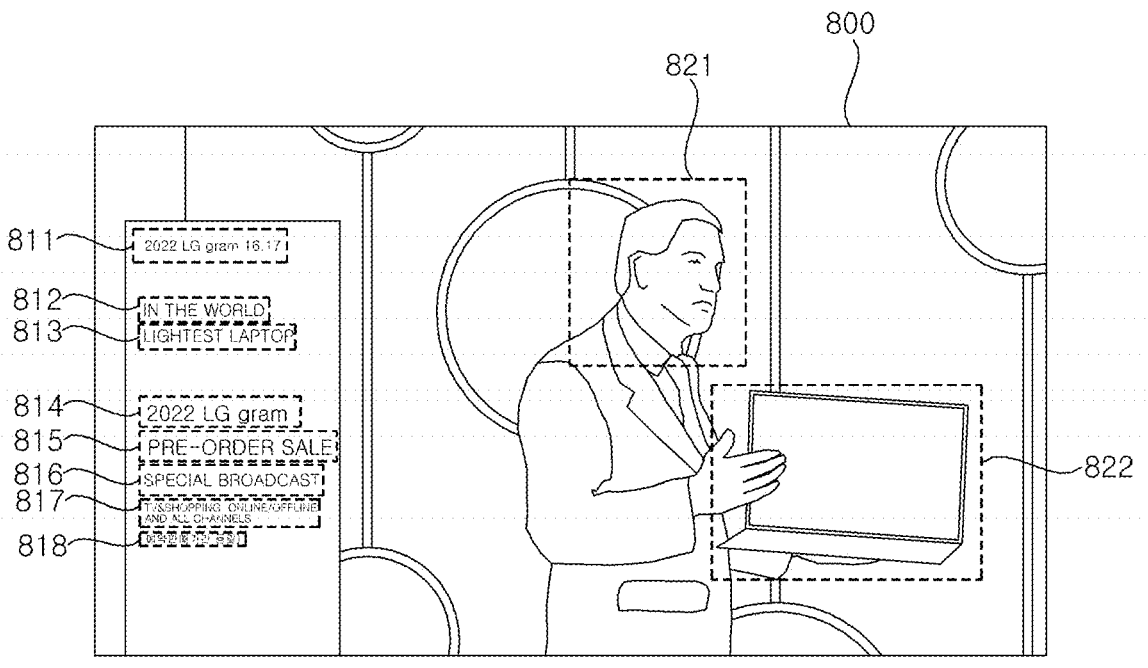

Referring to FIG. 8A, the image display apparatus 100 may receive a broadcast signal including a second image 800. The second image 800 may include a plurality of OC regions 811 to 818 in which open captions are displayed, a region 821 corresponding to a human face, and a region 822 corresponding to a thing.

The image display apparatus 100 may determine the genre of the second image 800. The image display apparatus 100 may determine the genre of the second image 800 based on the contents of text included in the second image 800. For example, the image display apparatus 100 may determine, as home shopping, the genre of the second image 800 based on the contents of the text of the OC regions 815, 817, and 818 in which 'pre-order', 'sale', and 'home shopping' are displayed among the plurality of OC regions 811 to 818. Meanwhile, the image display apparatus 100 may determine the genre of the second image 800 based on the position of the text included in the second image 800. For example, the image display apparatus 100 may determine, as home shopping, the genre of the second image 800 based on that the OC regions 815, 817, and 818 in which 'pre-order', 'sale', and 'home shopping' are displayed are placed at the left end of the screen, which is a preset position for home shopping.

Figure 8B:
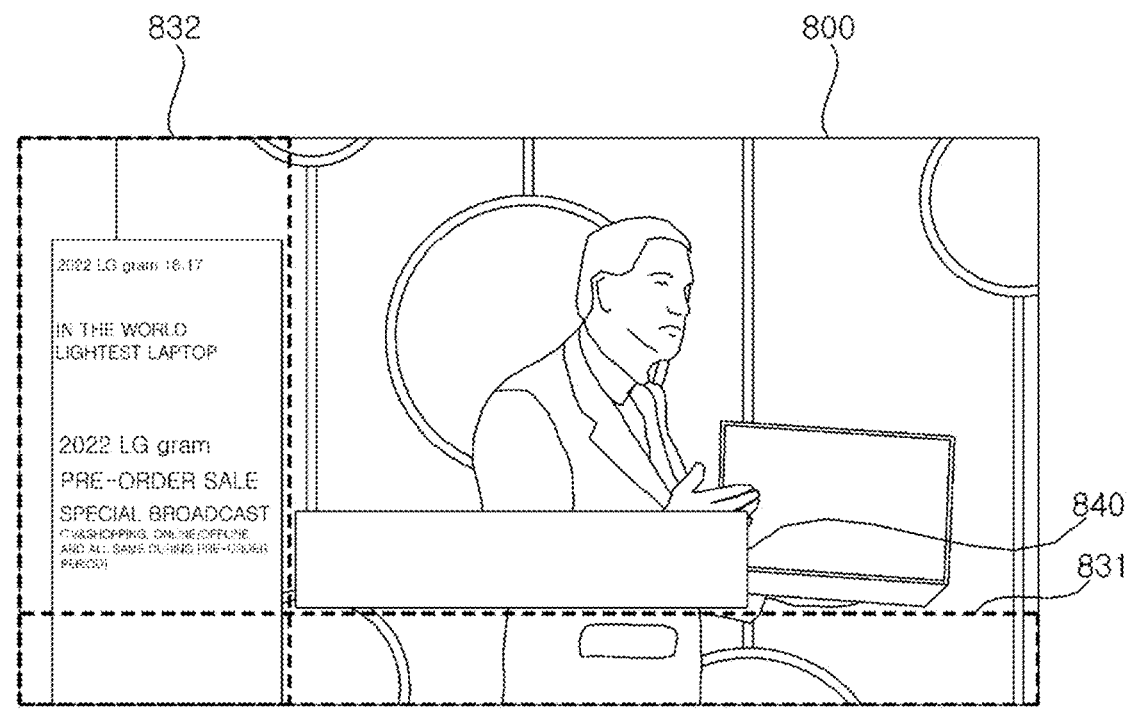

Referring to FIG. 8B, based on determining that the genre of the second image 800 is home shopping, the image display apparatus may set, as restricted regions, a region 831 corresponding to a first distance from the bottom of the screen of the display 180 and a region 832 corresponding to a second distance from a left end.

The image display apparatus 100 may determine a CC region 840. For example, the image display apparatus 100 may determine an initial setting region based on subtitle setting information. Here, when the initial setting region overlaps the restricted regions 831 and 832, the image display apparatus 100 may determine, as the CC region, the region located at the shortest distance from the initial setting region among the remaining regions excluding the restricted regions 831 and 832. Meanwhile, the image display apparatus 100 may determine, as the CC region, the initial setting region when the initial setting region does not overlap the restricted regions 831 and 832.

Figure 8C:
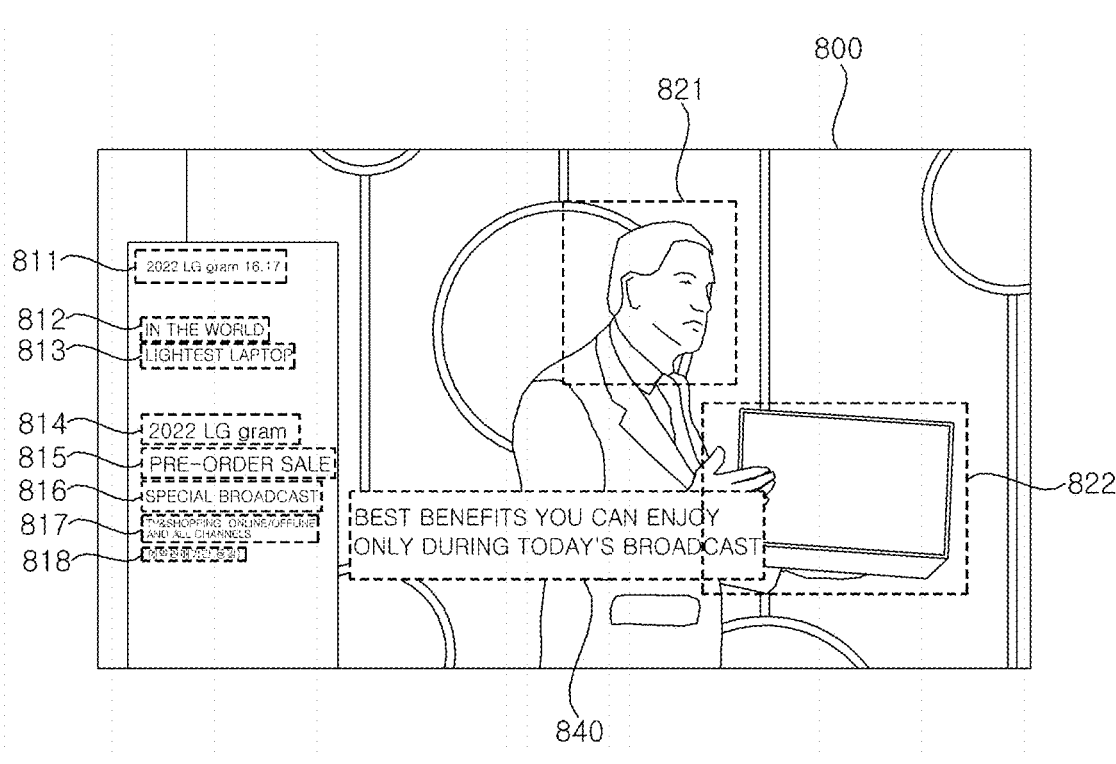

Referring to FIG. 8C, the image display apparatus 100 may determine whether the plurality of OC regions 811 to 818 and the CC region 840 overlap. Since the plurality of OC regions 811 to 818 and the CC region 840 do not overlap, the CC region 840 may be maintained. In addition, since the CC region 840 does not overlap the region 821 corresponding to the human face, the CC region 840 may be maintained. The image display apparatus 100 may display closed captions in the CC region 840 along with the second image 800. Here, the CC region 840 may overlap the region 822 corresponding to a thing.

Figure 9A:
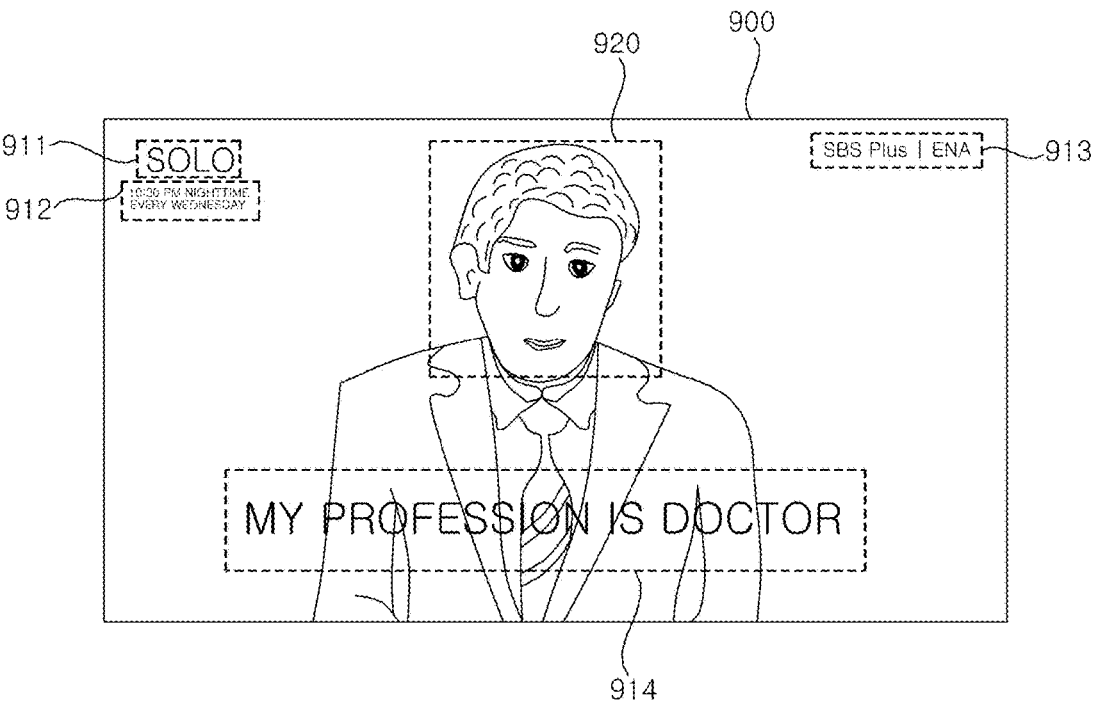

Referring to FIG. 9A, the image display apparatus 100 may receive a broadcast signal including a third image 900. The third image 900 may include a plurality of OC regions 911 to 914 in which open captions are displayed and a region 920 corresponding to a human face.

The image display apparatus 100 may determine the genre of the third image 900. The image display apparatus 100 may determine the genre of the third image 900 based on the contents of text included in the third image 900. For example, the image display apparatus 100 may determine, as entertainment, the genre of the third image 900 based on the contents of the text in the OC region 911 in which a title of specific content is displayed among the plurality of OC regions 911 to 914. Meanwhile, the image display apparatus 100 may determine the genre of the third image 900 based on the position of the text included in the third image 900. For example, the image display apparatus 100 may determine, as entertainment, the genre of the third image 900 based on the fact that the OC region 911, in which the title of the specific content is displayed, is located in the upper left end of the screen, which is a position indicating information on the content.

Figure 9B:
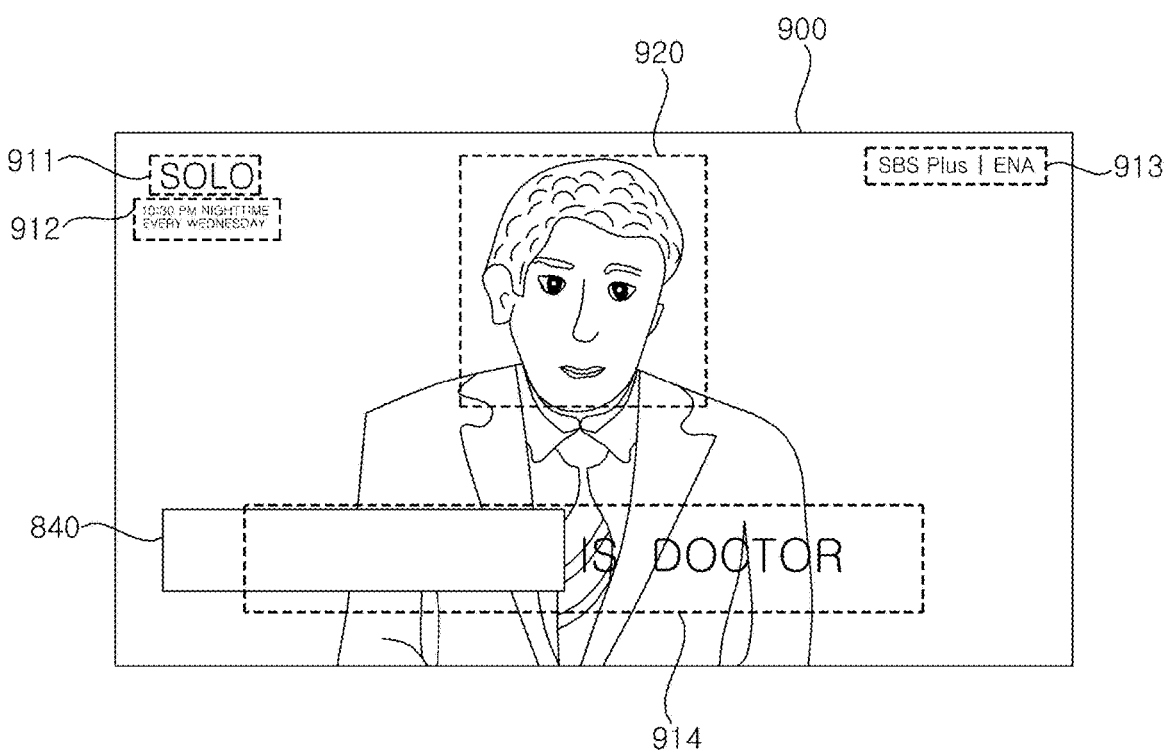

Referring to FIG. 9B, the image display apparatus 100 may not set a restricted region based on determining that the genre of the third image 900 is entertainment. The image display apparatus 100 may determine the CC region 940 based on subtitle setting information.

The image display apparatus 100 may determine whether the plurality of OC regions 911 to 914 and the CC region 940 overlap. Here, since one OC region 914 among the plurality of OC regions 911 to 914 overlaps the CC region 940, the image display apparatus 100 determines the size of the OC region 914 that overlaps the CC region 940.

Figure 9C:
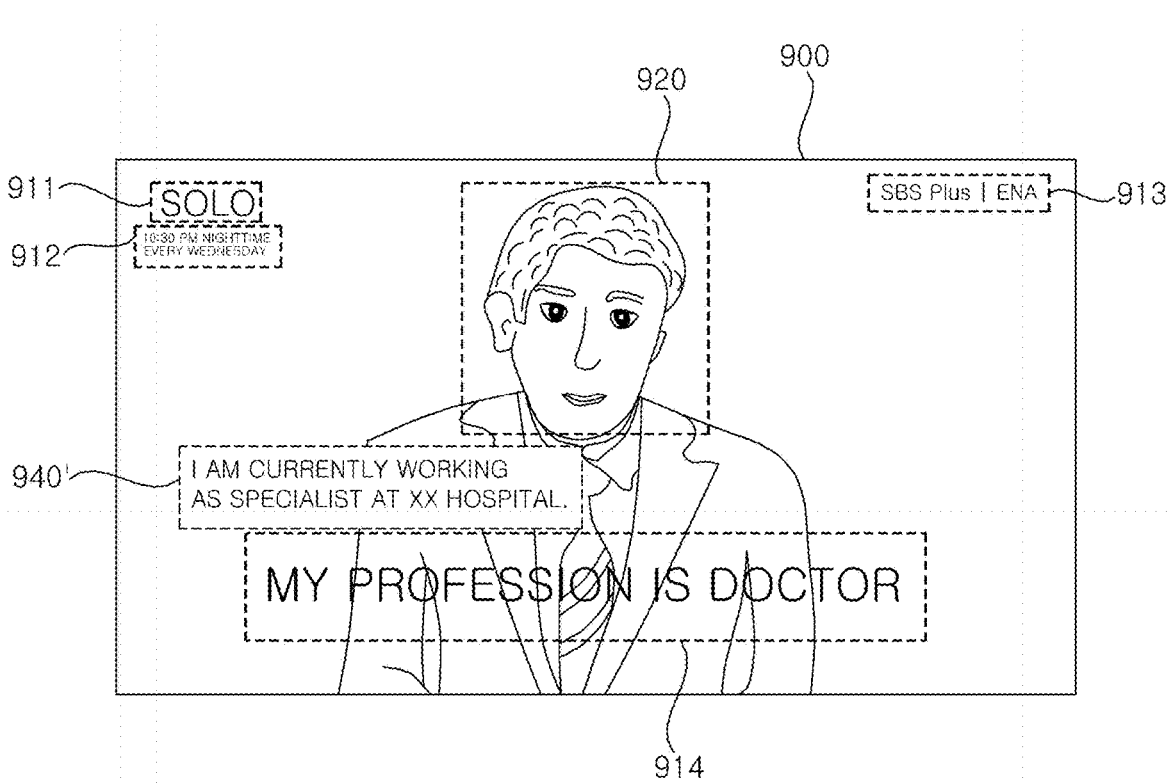

Referring to FIG. 9C, the size of the OC region 914 overlapping the CC region 940 may be included in a preset size range. Here, the image display apparatus 100 may determine the size of each of the OC regions 911 to 914. The image display apparatus 100 may change the CC region so that closed captions may be displayed in a region of the screen of the display 180, excluding the OC region whose size is within the preset size range. Here, the image display apparatus 100 may determine, as the CC region, the region 940' located at the shortest distance in the vertical direction from the region 940 previously set as the CC region. The corresponding region 940' may be a region that does not overlap the region 920 corresponding to the human face.

The image display apparatus 100 may display closed captions in the CC region 940' along with the third image 900.

Figure 10A:
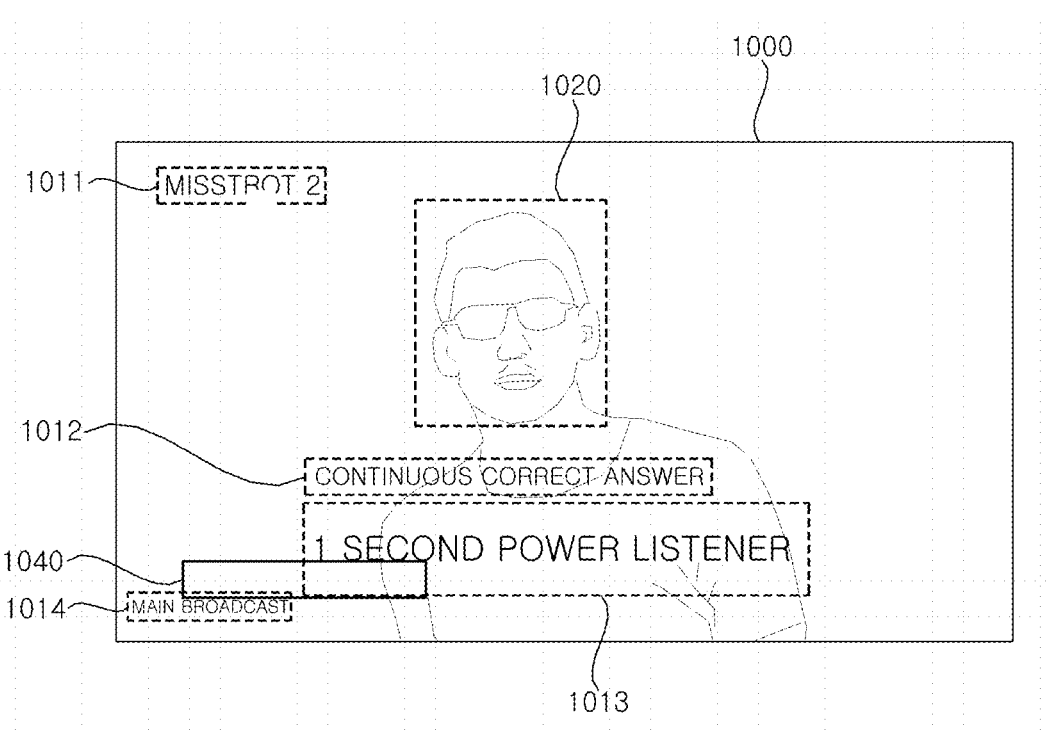

Referring to FIG. 10A, the image display apparatus 100 may receive a broadcast signal including a fourth image 1000. The fourth image 1000 may include a plurality of OC regions 1011 to 1014 in which open captions are displayed and a region 1020 corresponding to a human face.

The image display apparatus 100 may determine the genre of the fourth image 1000. The image display apparatus 100 may determine the genre of the fourth image 1000 based on the contents of text included in the fourth image 1000. For example, the image display apparatus 100 determines, as entertainment, the genre of the fourth image 1000 based on the contents of the text in the OC region 1011 in which a title of a specific content is displayed among the plurality of OC regions 1011 to 1014. Meanwhile, the image display apparatus 100 may determine the genre of the fourth image 1000 based on the position of the text included in the fourth image 1000. For example, the image display apparatus 100 may determine, as entertainment, the genre of the fourth image 1000 based on the fact that the OC region 1011, in which the title of the specific content is displayed, is located in the upper left end of the screen, which is a position indicating information on the content.

The image display apparatus 100 may not set a restricted region based on the fact that the genre of the fourth image 1000 is determined to be entertainment. The image display apparatus 100 may determine the CC region 1040 based on subtitle setting information.

Figure 10B:
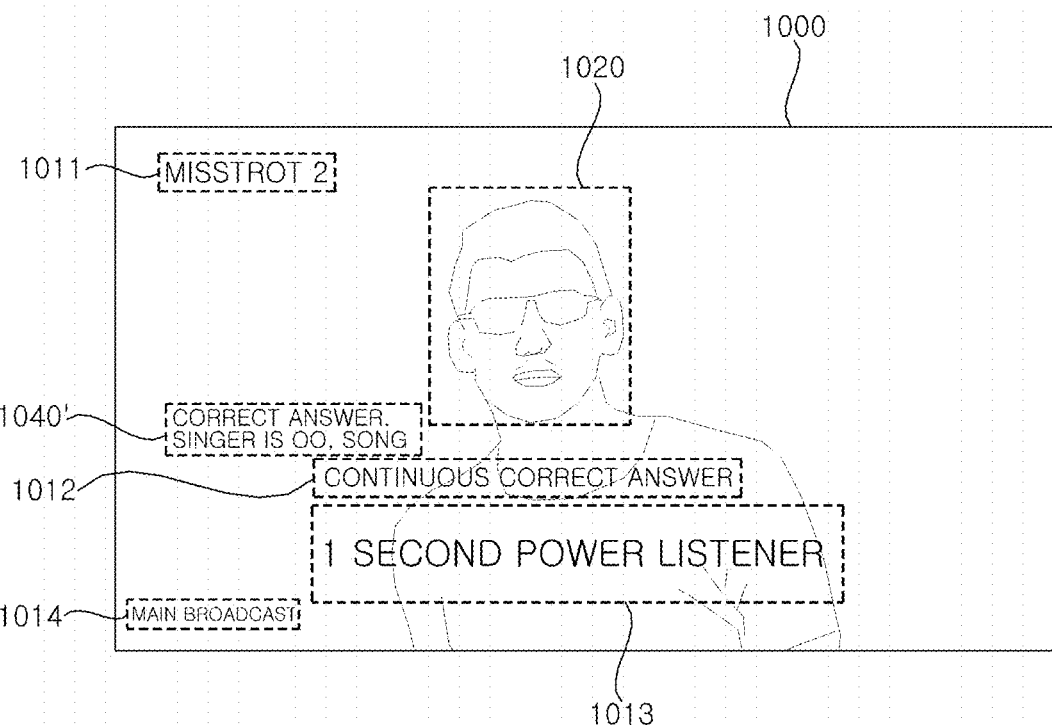

The image display apparatus 100 may determine whether the plurality of OC regions 1011 to 1014 and the CC region 1040 overlap. Here, since two regions 1013 and 1014 of the plurality of OC regions 1011 to 1014 overlap the CC region 1040, the image display apparatus 100 may determine the size of two regions 1013 and 1014 that overlap the CC region 1040. Referring to FIG. 10B, in the case of displaying closed captions in a region 1040' that does not overlap the plurality of OC regions 1011 to 1014, regardless of the size of the two regions 1013 and 1014 overlapping the CC region 1040, the position at which closed captions are displayed may change frequently, and the spacing between positions at which closed captions are displayed may become excessively distant.

Figure 10C:
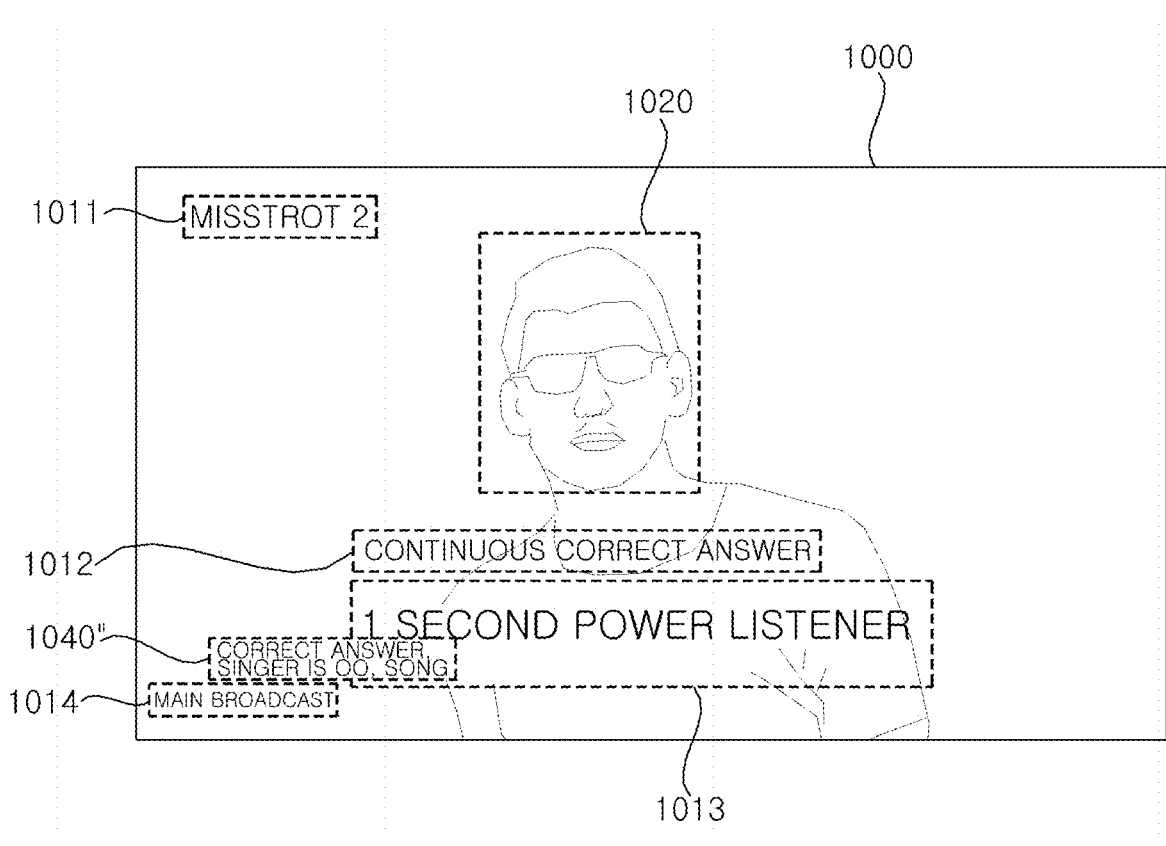

Referring to FIG. 10C, the size of one region 1013 overlapping the CC region 1040 is not included in the preset size range, and the size of the other region 1014 may be included in the preset size range. The image display apparatus 100 may change the CC region so that closed captions are displayed in a region of the screen of the display 180, excluding the OC region whose size is within the preset size range. Here, the image display apparatus 100 may determine, as the CC region, a region 1040" located at the shortest distance in the vertical direction from the region 1040 previously set as the CC region.

The image display apparatus 100 may display closed captions in the CC region 1040" along with the fourth image 1000. Here, the closed captions displayed in the CC region 1040" may overlap the OC region 1013 whose size is not included in the preset size range. If the size of the OC region 1013 overlapping the CC region 1040" is large enough to not be included in the preset size range, there is a high possibility that the user may identify the contents of the open captions even if the closed captions cover part of the open captions. In addition, if the size of the OC region overlapping the CC region 1040" is small enough to not be included in the preset size range, the importance of information delivered to the user through open captions is likely to be low. Therefore, in some cases, the user may fully understand the contents of the image even if the closed captions cover part of the open captions.

Figure 11A:
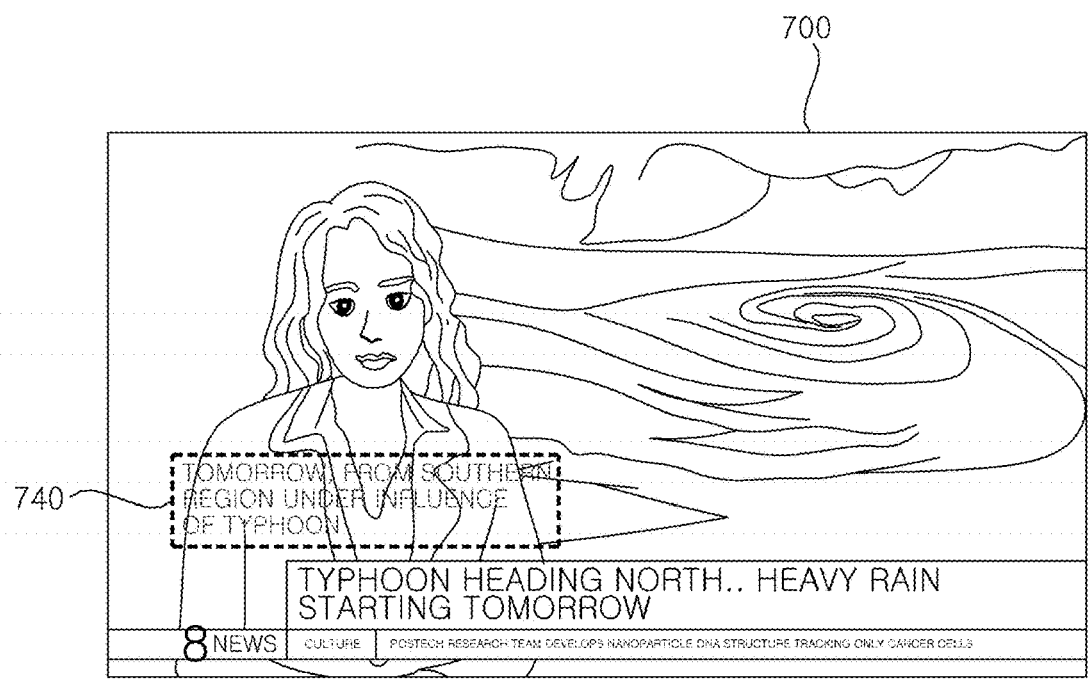

Referring to FIG. 11A, the image display apparatus 100 may display closed captions in the CC region 740 along with the first image 700. Here, in a state in which the background of the closed captions is previously set to be displayed transparently, the color of the image corresponding to the CC region 740 may correspond to the color of the closed captions. For example, when the color of the closed captions is black and the color of the image corresponding to the CC region 740 is black, navy blue, or purple, the readability of the closed captions may be significantly reduced.

According to an embodiment of the present disclosure, when the color of the image corresponding to the position at which closed captions are displayed corresponds to the color of the closed captions in a state in which the background of the closed captions are previously set to be displayed transparently, the image display apparatus 100 may change at least one of the color of the closed captions, the color of the background of the closed captions, and the transparency of the background of the closed captions.

Figure 11B:
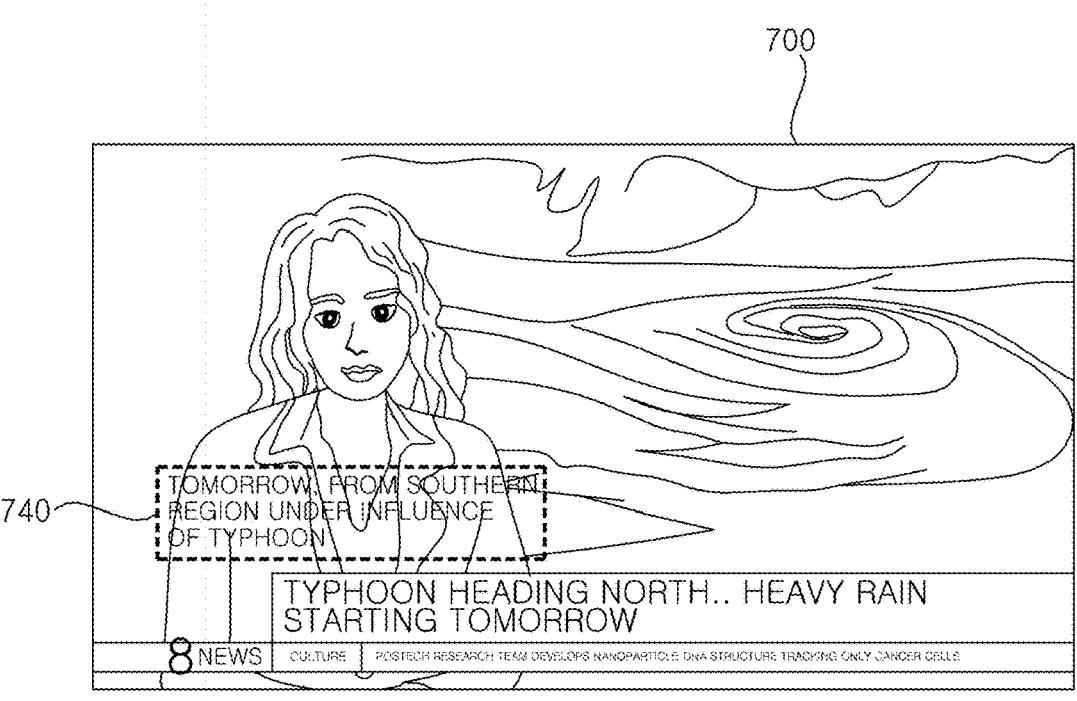

Referring to FIG. 11B, the image display apparatus 100 may change the color of the closed captions displayed in the CC region 740 to a specific color based on the color of the image corresponding to the CC region 740. Here, the specific color may be a color that contrasts with the color of the image corresponding to the CC region 740. For example, the image display apparatus 100 may change the color of the closed captions to a complementary color of the color that occupies the largest proportion among the colors of the image corresponding to the CC region 740. For example, the image display apparatus 100 may change the color of the closed captions to a complementary color of a representative value (e.g., average) of the color of the image corresponding to the CC region 740.

Figure 11C:
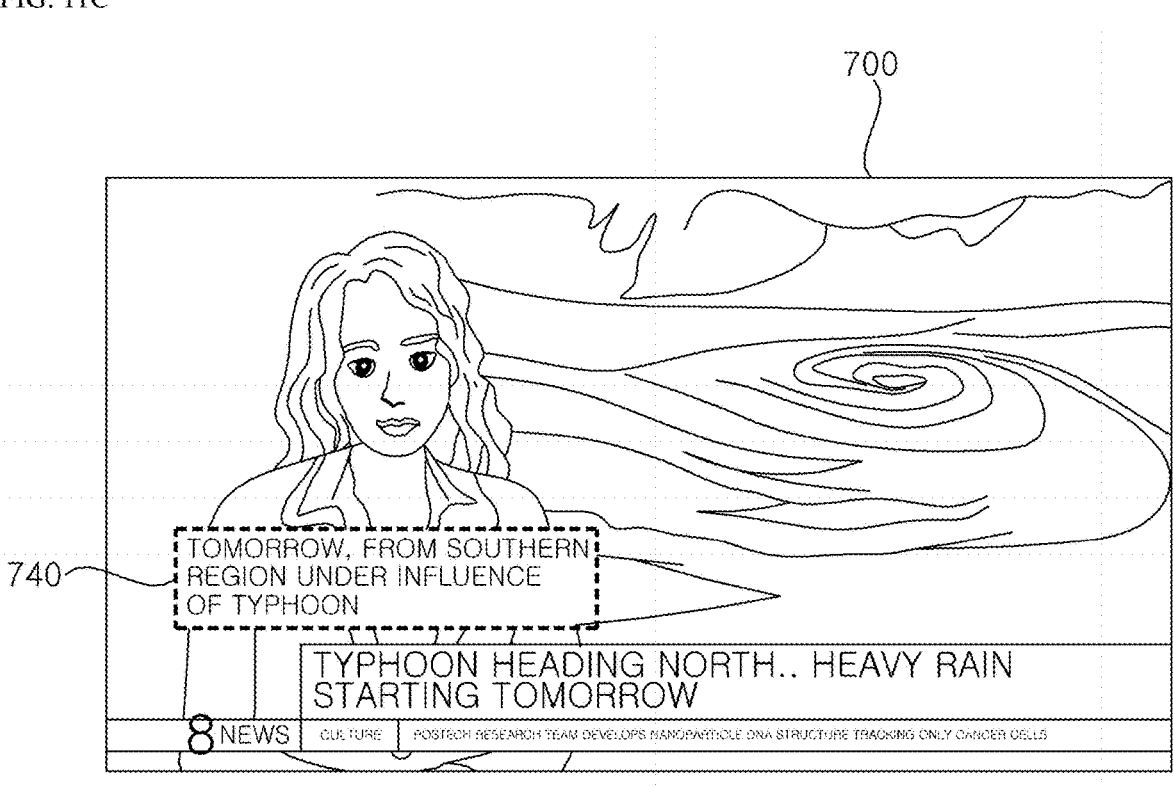

Referring to FIG. 11C, the image display apparatus 100 may change the color of the background of the closed captions displayed in the CC region 740. The image display apparatus 100 may change the color of the background of the closed captions displayed in the CC region 740 to a specific color based on the color of the image corresponding to the CC region 740 and/or the color of the closed captions. Here, the specific color may be a color that contrasts with the color of the image corresponding to the CC region 740 and/or the color of the closed captions. For example, the image display apparatus 100 may change the color of the background of the closed captions to a complementary color to the color of the closed captions. For example, the image display apparatus 100 may change the color of the background of the closed captions to a complementary color of the color that occupies the largest proportion among the colors of the image corresponding to the CC region 740.

As described above, according to at least one embodiment of the present disclosure, the position at which closed captions are displayed may be changed so that the user may identify information included in the image.

In addition, according to at least one embodiment of the present disclosure, frequent changes in the position at which closed captions are displayed may be prevented.

In addition, according to at least one embodiment of the present disclosure, readability of closed captions may be improved.

Referring to FIGS. 1 to 11C, the image display apparatus 100 according to an aspect of the present disclosure includes a display configured to output a screen containing an image and closed captions; and a controller, wherein the controller is configured to determine whether a first region corresponding to open captions included in the image overlaps a second region previously set for the closed captions, determine a size of the first region based on that the first region overlaps the second region, display the closed captions in one region of the screen excluding the first region, when the size of the first region is within a preset range, and display the closed captions in the second region when the size of the first region is not within the preset range.

In addition, according to one aspect of the present disclosure, the preset range may be determined according to a preset ratio to a total size of the screen.

In addition, according to one aspect of the present disclosure, the controller may be configured to determine, when a third region corresponding to the open captions and not overlapping the second region is included in the image, determines a size of the third region, and when the size of the third region is within the preset range, the third region is not included in one region of the screen, and when the size of the third region is not within the preset range, the third region is included in one region of the screen.

In addition, according to one aspect of the present disclosure, the controller may be configured to display the closed captions in a portion of one region of the screen located at a shortest distance from the second region in a preset direction when the size of the first region is within the preset range.

In addition, according to one aspect of the present disclosure, the controller may be configured to identify an object corresponding to a human face among objects included in the image and display the closed captions in a remaining region excluding a fourth region corresponding to the human face, in one region of the screen.

In addition, according to one aspect of the present disclosure, the controller may be configured to change at least one of a color of the closed captions, a color of a background of the closed captions, and transparency of the background of the closed captions when a color of the image corresponding to a position at which the closed captions are displayed corresponds to the color of the closed captions in a state in which the background of the closed captions is previously set to be displayed transparently.

In addition, according to one aspect of the present disclosure, the controller may be configured to change the color of the closed captions to a specific color that contrasts with the color of the image corresponding to the position at which the closed captions are displayed.

In addition, according to one aspect of the present disclosure, the controller may be configured to determine a genre of the image based on an object included in the image, determine a restricted region corresponding to the genre of the image in which display of the closed captions is restricted, and determine a position of the second region in a remaining region of the screen excluding the restricted region.

An operating method of an image display apparatus for outputting a screen including an image and closed captions includes determining whether a first region corresponding to open captions included in the image overlaps a second region previously set for the closed captions, determining a size of the first region based on that the first region overlaps the second region, displaying the closed captions in one region of the screen excluding the first region through a display, when the size of the first region is within a preset range, and displaying the closed captions in the second region through the display when the size of the first region is not within the preset range.

In addition, according to one aspect of the present disclosure, the preset range may be determined according to a preset ratio to a total size of the screen.

In addition, according to one aspect of the present disclosure, the operating method may further include determining, when a third region corresponding to the open captions and not overlapping the second region is included in the image, a size of the third region, wherein when the size of the third region is within the preset range, the third region is not included in one region of the screen, and when the size of the third region is not within the preset range, the third region is included in one region of the screen.

In addition, according to one aspect of the present disclosure, the displaying of the closed captions in one region of the screen may include displaying the closed captions in a portion of one region of the screen located at a shortest distance from the second region in a preset direction.

In addition, according to one aspect of the present disclosure, the operating method may further include identifying an object corresponding to a human face among objects included in the image, wherein the displaying of the closed captions in one region of the screen comprises displaying the closed captions in a remaining region excluding a fourth region corresponding to the human face, in one region of the screen.

In addition, according to one aspect of the present disclosure, the operating method may further include changing a color of the closed captions into a specific color that contrasts with a color of the image corresponding to a position at which the closed captions are displayed, when the color of the image corresponding to the position at which the closed captions are displayed corresponds to the color of the closed captions in a state in which a background of the closed captions is previously set to be displayed transparently.

In addition, according to one aspect of the present disclosure, the operating method may further include determining a genre of the image based on an object included in the image, determining a restricted region corresponding to the genre of the image in which display of the closed captions is restricted, and determining a position of the second region in a remaining region of the screen excluding the restricted region.

The accompanying drawings of the present disclosure aim to facilitate understanding of the present disclosure and should not be construed as limited to the accompanying drawings. Also, the present disclosure is not limited to a specific disclosed form, but includes all modifications, equivalents, and substitutions without departing from the scope and spirit of the present disclosure.

The operating method according to embodiments of the present disclosure may be implemented as codes that may be read by a processor in a recording medium that may be read by the processor. The processor-readable recording medium may include any type of recording devices in which data that may be read by the processor is stored. Examples of the processor-readable recording medium include ROM, RAM, CD-ROM, a magnetic tape, a floppy disc, optical data storage devices, and the like. In addition, the processor-readable recording medium also includes implementations in the form of carrier waves, e.g., transmission via the Internet. The processor-readable recording medium may be distributed over network-connected computer systems so that processor-readable codes may be stored and executed in a distributed fashion.

Specific embodiments have been described. However, the present disclosure is not limited to the specific embodiments and various modifications may be made without departing from the scope of the present disclosure claimed in the claims, and such modifications should not be individually understood from technical concepts or prospects of the present disclosure.

What is claimed is:

1. An image display apparatus comprising:
a display configured to output a screen containing an image and closed captions; and
a controller configured to:
determine whether a first region corresponding to open captions included in the image overlaps a second region previously set for the closed captions,
determine a size of the first region based on that the first region overlaps the second region,
display the closed captions in a region of the screen excluding the first region, based on the size of the first region being within a preset range defined by at least one of a predetermined maximum size and a predetermined minimum size, and
display the closed captions in the second region based on the size of the first region not being within the preset range.

2. The image display apparatus of claim 1, wherein the preset range is determined according to a preset ratio to a total size of the screen.

3. The image display apparatus of claim 1, wherein the controller is configured to determine, when a third region corresponding to the open captions and not overlapping the second region is included in the image, a size of the third region, and
when the size of the third region is within the preset range, the third region is not included in the region of the screen excluding the first region, and
when the size of the third region is not within the preset range, the third region is included in the region of the screen excluding the first region.

4. The image display apparatus of claim 1, wherein the controller is configured to display the closed captions in a portion of the region of the screen excluding the first region, which is located at a shortest distance from the second region in a preset direction when the size of the first region is within the preset range.

5. The image display apparatus of claim 1, wherein the controller is configured to:

identify an object corresponding to a human face among objects included in the image, and display the closed captions in a remaining region excluding a fourth region corresponding to the human face, in the region of the screen excluding the first region.

6. The image display apparatus of claim 1, wherein the controller is configured to change at least one of a color of the closed captions, a color of a background of the closed captions, or transparency of the background of the closed captions, when a color of the image corresponding to a position at which the closed captions are displayed corresponds to the color of the closed captions in a state in which the background of the closed captions is previously set to be displayed transparently.

7. The image display apparatus of claim 6, wherein controller is configured to change the color of the closed captions to a specific color that contrasts with the color of the image corresponding to the position at which the closed captions are displayed.

8. The image display apparatus of claim 1, wherein the controller is configured to:

determine a genre of the image based on an object included in the image, determine a restricted region corresponding to the genre of the image in which display of the closed captions is restricted, and determine a position of the second region in a remaining region of the screen excluding the restricted region.

9. An operating method of an image display apparatus for outputting a screen including an image and closed captions, the operating method comprising:

determining whether a first region corresponding to open captions included in the image overlaps a second region previously set for the closed captions;

determining a size of the first region based on that the first region overlaps the second region;

displaying the closed captions in a region of the screen excluding the first region through a display, based on the size of the first region being within a preset range defined by at least one of a predetermined maximum size and a predetermined minimum size, and displaying the closed captions in the second region through the display based on the size of the first region not being within the preset range.

10. The operating method of claim 9, wherein the preset range is determined according to a preset ratio to a total size of the screen.

11. The operating method of claim 9, further comprising:

determining, when a third region corresponding to the open captions and not overlapping the second region is included in the image, a size of the third region, wherein when the size of the third region is within the preset range, the third region is not included in one region of the screen excluding the first region, and when the size of the third region is not within the preset range, the third region is included in one region of the screen excluding the first region.

12. The operating method of claim 9, wherein the displaying of the closed captions in one region of the screen excluding the first region comprises displaying the closed captions in a portion of one region of the screen excluding the first region located at a shortest distance from the second region in a preset direction.

13. The operating method of claim 9, further comprising:

identifying an object corresponding to a human face among objects included in the image, wherein the displaying of the closed captions in the region of the screen excluding the first region comprises displaying the closed captions in a remaining region excluding a fourth region corresponding to the human face, in the region of the screen excluding the first region.

14. The operating method of claim 9, further comprising:

changing a color of the closed captions into a specific color that contrasts with a color of the image corresponding to a position at which the closed captions are displayed, when the color of the image corresponding to the position at which the closed captions are displayed corresponds to the color of the closed captions in a state in which a background of the closed captions is previously set to be displayed transparently.

15. The operating method of claim 9, further comprising:

determining a genre of the image based on an object included in the image, determining a restricted region corresponding to the genre of the image in which display of the closed captions is restricted, and determining a position of the second region in a remaining region of the screen excluding the restricted region.

* * * * *